United States Patent
Monson et al.

(10) Patent No.: US 12,444,429 B2
(45) Date of Patent: Oct. 14, 2025

(54) SPEECH IDENTIFICATION AND EXTRACTION FROM NOISE USING EXTENDED HIGH FREQUENCY INFORMATION

(71) Applicant: THE BOARD OF TRUSTEES OF THE UNIVERSITY OF ILLINOIS, Urbana, IL (US)

(72) Inventors: Brian B Monson, Champaign, IL (US); Rohit M Ananthanarayana, Champaign, IL (US)

(73) Assignee: The Board of Regents of the University of Illinois, Urbana, IL (US)

( * ) Notice: Subject to any disclaimer, the term of this patent is extended or adjusted under 35 U.S.C. 154(b) by 280 days.

(21) Appl. No.: 18/085,705

(22) Filed: Dec. 21, 2022

(65) Prior Publication Data

US 2023/0197099 A1   Jun. 22, 2023

Related U.S. Application Data

(60) Provisional application No. 63/292,307, filed on Dec. 21, 2021.

(51) Int. Cl.
*G10L 21/0232* (2013.01)
*G10L 21/0224* (2013.01)
(Continued)

(52) U.S. Cl.
CPC ...... *G10L 21/0232* (2013.01); *G10L 21/0224* (2013.01); *G10L 21/0272* (2013.01);
(Continued)

(58) Field of Classification Search
CPC ............. G10L 21/0232; G10L 21/0224; G10L 21/0272; G10L 21/0308; G10L 25/09; G10L 25/18; G10L 25/21; G10L 25/84
See application file for complete search history.

(56) References Cited

U.S. PATENT DOCUMENTS 9,165,567 B2 * 10/2015 Visser ..................... G10L 25/78
9,467,569 B2 * 10/2016 Femal ..................... G10L 25/78
(Continued)

OTHER PUBLICATIONS

Trine, Allison, and Brian B. Monson, "Extended High Frequencies Provide Both Spectral and Temporal Information to Improve Speech-in-Speech Recognition", Dec. 21, 2020, Trends in Hearing, vol. 24, pp. 1-8. (Year: 2020).*
(Continued)

*Primary Examiner* — Daniel C Washburn
*Assistant Examiner* — James Boggs
(74) *Attorney, Agent, or Firm* — McDonnell Boehnen Hulbert & Berghoff LLP

(57) ABSTRACT

Improved systems and methods are provided herein for extracting target speech from audio signals that can contain masking speech or other unwanted noise content. These systems and methods include detection of target speech in an input signal by detecting elevated frequency content in the signal above a threshold frequency. Portions of the signal determined to contain such elevated high frequency content are then used to generate audio filters to extract target speech from subsequently-obtained audio signals. This can include performing non-negative matrix factorization to determine a set of basis vectors to represent noise content in the spectral domain and then using the set of basis vectors to decompose subsequently-obtained audio signals into noise signals that can then be removed from the audio signals.

16 Claims, 7 Drawing Sheets
(2 of 7 Drawing Sheet(s) Filed in Color)

(51) Int. Cl.

| | |
|---|---|
| *G10L 21/0272* | (2013.01) |
| *G10L 21/0308* | (2013.01) |
| *G10L 25/09* | (2013.01) |
| *G10L 25/18* | (2013.01) |
| *G10L 25/21* | (2013.01) |
| *G10L 25/84* | (2013.01) |

(52) U.S. Cl.
CPC .......... *G10L 21/0308* (2013.01); *G10L 25/09* (2013.01); *G10L 25/18* (2013.01); *G10L 25/21* (2013.01); *G10L 25/84* (2013.01)

(56) References Cited

U.S. PATENT DOCUMENTS

| | | | | |
|---|---|---|---|---|
| 9,552,825 | B2* | 1/2017 | Venkatesha | G10L 21/0208 |
| 10,923,111 | B1* | 2/2021 | Fan | G10L 15/16 |
| 11,479,184 | B2* | 10/2022 | Kobayashi | H04R 3/002 |
| 11,482,225 | B2* | 10/2022 | Pinder | H04L 65/1089 |
| 11,631,404 | B2* | 4/2023 | Pereira | G06V 10/50 |
| | | | | 704/233 |
| 12,217,761 | B2* | 2/2025 | Chen | G10L 25/78 |
| 2017/0318374 | A1* | 11/2017 | Dolenc | H04R 29/004 |
| 2024/0144952 | A1* | 5/2024 | Ikeshita | G10L 21/0308 |

OTHER PUBLICATIONS

Levy, Suzanne Carr, Daniel J. Freed, Michael Nilsson, Brian C. J. Moore, and Sunil Puria, "Extended high-frequency bandwidth improves reception of speech in spatially separated masking speech", Sep. 2015, Ear and Hearing, vol. 36, No. 5, pp. 1-27. (Year: 2015).*

Gaikwad, Snehal S., Pallavi P. Ingale, and S. L. Nalbalwar, "Separation of singing voice from background musical noise using modified NMF and Filtering", Mar. 2016, 2016 International Conference on Electrical, Electronics, and Optimization Techniques (ICEEOT), pp. 1565-1568. (Year: 2016).*

Nathwani, Karan, Anurag Kumar, and Rajesh M. Hegde, "Monaural Speaker Segregation using Group Delay Spectral Matrix Factorization", May 2014, 2014 Twentieth National Conference on Communications (NCC), pp. 1-6. (Year: 2014).*

Nikunen, Joonas, and Tuomas Virtanen, "Source Separation and Reconstruction of Spatial Audio Using Spectrogram Factorization", Oct. 2017, Parametric Time-Frequency Domain Spatial Audio, John Wiley & Sons, pp. 215-250. (Year: 2017).*

Feng, Yuxiao, and Christian Ritz, "Single-channel speech separation by including spectral structure information within non-negative matrix factorization", Jul. 2015, 2015 IEEE China Summit and International Conference on Signal and Information Processing (ChinaSIP), pp. 620-624. (Year: 2015).*

Kim, Seon Man, Ji Hun Park, Hong Kook Kim, Sung Joo Lee, and Yun Keun Lee, "Non-negative Matrix Factorization Based Noise Reduction for Noise Robust Automatic Speech Recognition", Mar. 2012, 10th International Conference on Latent Variable Analysis and Signal Separation (LVA/ICA 2012), pp. 338-346. (Year: 2012).*

Mohammadiha, Nasser, Timo Gerkmann, and Arne Leijon, "A New Approach for Speech Enhancement Based on a Constrained Non-negative Matrix Factorization", Dec. 2011, International Symposium on Intelligent Signal Processing and Communication Systems (ISPACS), vol. 7. (Year: 2011).*

Virtanen, Tuomas, "Monaural Sound Source Separation by Non-negative Matrix Factorization with Temporal Continuity and Sparseness Criteria", Mar. 2007, IEEE Transactions on Audio, Speech, and Language Processing, vol. 15, No. 3, pp. 1066-1074. (Year: 2007).*

Dos Santos Moura, Mateus, Alexandre Miccheleti Lucena, Kenji Nose Filho, and Ricardo Suyama, "Source Extraction based on Binary Masking and Machine Learning", Nov. 2021, 6th Workshop on Communication Networks and Power Systems (WCNPS 2021), pp. 1-6. (Year: 2021).*

Shoba, S., and R. Rajavel, "Adaptive energy threshold for monaural speech separation", Apr. 2017, 2017 International Conference on Communication and Signal Processing (ICCSP), pp. 0905-0908. (Year: 2017).*

Monson et al., "Horizontal directivity of low- and high-frequency energy in speech and singing", J. Acoust. Soc. Am. 132 (1), Jul. 2012, pp. 433-441.

Middlebrooks, "Sound localization", Handbook of Clinical Neurology, vol. 129 (3rd series), Chapter 6, 2015, pp. 99-116.

McDermott et al., "Sound Texture Perception via Statistics of the Auditory Periphery: Evidence from Sound Synthesis", Neuron Article, 71, Sep. 8, 2011, pp. 926-940.

Masterton et al., "The Evolution of Human Hearing", The Journal of the Acoustical Society of America, vol. 45, No. 4, (1969) pp. 966-985.

Martin et al., "Spatial release from speech-on-speech masking in the median sagittal plane", J. Acoust. Soc. Am. 131 (1), Jan. 2012, pp. 378-385.

Geoffrey A. Manley, "Comparative Auditory Neuroscience: Understanding the Evolution and Function of Ears", Journal of the Association for Research in Otolaryngology, 18: 1-24, 2017.

Richard P. Lippmann, "Accurate Consonant Perception Without Mid-Frequency Speech Energy", IEEE Transactions on Speech and Audio Processing, vol. 4, No. 1, Jan. 1996, pp. 66-69.

Liberman et al., "The Discrimination of Speech Sounds Within and Across Phoneme Boundaries", Journal of Experimental Psychology, vol. 54, No. 5, 1957, pp. 358-368.

Levy et al., "Extended high-frequency bandwidth improves reception of speech in spatially separated masking speech", Ear Hear. 2015; 36(5), pp. 1-27.

H. Levitt, "Transformed Up-Down Methods in Psychoacoustics", The Journal of the Acoustical Society of America, vol. 49, No. 2, 1971, pp. 467-477.

Kuhl et al., "Linguistic Experience Alters Phonetic Perception in Infants by 6 Months of Age", Science, vol. 255, Jan. 31, 1992, pp. 606-608.

Kocon et al., "Horizontal directivity patterns differ between vowels extracted from running speech", J. Acoust. Soc. Am. 144 (1), Jul. 2018, pp. EL7-EL12.

Sergei Kochkin, "MarkeTrak VIII: Consumer satisfaction with hearing aids is slowly increasing", The Hearing Journal, Jan. 2010, vol. 63, No. 1, pp. 19-32.

King et al., "The Impack of Signal Bandwidth on Auditory Localization: Implications for the Design of Three-Dimensional Audio Displays", Human Factors, 1997, 39(2), 287-295.

Kato et al., "Spatial acoustic cues for the auditory perception of speaker's facing direction", Proceedings of 20th International Congress on Acoustics, ICA 2010, pp. 1-8.

Imbery et al., "Auditory Facing Angle Perception: The Effect of Different Source Positions in a Real and an Anechoic Environment", ACTA Acustica United with Acustica, vol. 105, 2019, pp. 492-505.

Hoy et al., "The Evolution of Hearing in Insects as an Adaptation to Predation from Bats", The Evolutionary Biology of Hearing, 1992, pp. 115-129.

Heffner et al., "High-Frequency Hearing", 2008, pp. 55-60.

Heffner et al., "Hearing Ranges of Laboratory Animals", Journal of the American Association for Laboratory Animal Science, vol. 46, No. 1, Jan. 2007, pp. 20-22.

Rickye S. Heffner, "Primate Hearing From a Mammalian Perspective", The Anatomical Record Part A, 281A:1111-1122, 2004.

"The Evolution of Communication: Historical Overview", University of Illinois, Urbana Champaign, Chapter 2, Mar. 2023, pp. 17-70.

Halkosaari et al., "Directivity of Artificial and Human Speech", J. Audio Eng. Socl, vol. 53, No. 7/8, Jul./Aug. 2005, pp. 620-631.

Green et al., "High-frequency audiometric assessment of a young adult population", J. Acoust. Soc. Am. 81 (2), Feb. 1987, pp. 485-494.

Glasberg et al., "Derivation of auditory filter shapes from notched-noise data", Hearing Research, 47 (1990), pp. 103-138.

Fletcher et al., "Articulation Testing Methods", Downloaded on Mar. 8, 2023, IEEE, pp. 806-854.

(56) References Cited

OTHER PUBLICATIONS

Fletcher et al., "The Perception of Speech and Its Relation to Telephony", The Journal of the Acoustical Society of America, vol. 22, No. 2, 1950, pp. 89-151.
Richard R. Fay, "Comparative psychoacoustics", Hearing Research, 34, 1988, pp. 295-306.
Edlund et al., "On the effect of the acoustic environment on the accuracy of perception of speaker orientation from auditory cues alone", 2012, 5 pages.
Derey et al., "Localization of complex sounds is modulated by behavioral relevance and sound category", J. Acoust. Soc. Am. 142 (4), Oct. 2017, pp. 1757-1773.
Crouzet et al., "On the Various Influences of Envelope Information on the Perception of Speech in Adverse Conditions: An Analysis of Between-Channel Envelope Correlation", 2001, 4 pages.
Chu et al., "Detailed Directivity of Sound Fields Around Human Talkers", National Research Council Canada, Dec. 2022.
Cherry, "Some Experiments on the Recognition of Speech, with One and with Two Ears", The Journal of the Acoustical Society of America, vol. 25, No. 5, Sep. 1953, pp. 975-979.
Carlile et al., "the localisation of spectrally restricted sounds by human listeners", Hearing Research 128 (1999), pp. 175-189.
Brungart et al., "Effects of bandwidth on auditory localization with a noise masker", J. Acoust. Soc. Am. 126 (6), Dec. 2009, pp. 3199-3208.
Best et al., "The role of high frequencies in speech localization", J. Acoust. Soc. Am. 118 (1), Jul. 2005, pp. 353-363.
Berlin et al., "Superior Ultra-Audiometric Hearing: A New Type of Hearing Loss Which Correlates Highly With Unusually Good Speech in the Profoundly Deaf", vol. 86, Jan.-Feb. 1978, pp. ORL-111 to ORL-116.
Bench et al., "The BKB (Banford-Kowal-Bench) Sentence Lists for Partially-Hearing Children", British Journal of Audiology, 1979, 13, pp. 108-112.
Badri et al., "Auditory filter shapes and high-frequency hearing in adults who have impaired speech in noise performance despite clinically normal audiograms", J. Acoust. Soc. Am. 129 (2), Feb. 2011, pp. 852-863.
Arbogast et al., "Achieved Gain and Subjective Outcomes for a Wide-Bandwidth Contact Hearing Aid Fitted Using CAM2" Ear & Hearing, vol. 40, No. 3, 2018, pp. 741-756.
Wilson et al., "Perception of head orientation", Vision Research, 40, 2000, pp. 459-472.
Werker et al., "Cross-Language Speech Perception: Evidence for Perceptual Reorganization During the First Year of Life", Infant Behavior and Development 7, 1984, pp. 49-63.
Vitela et al., "Phoneme categorization relying solely on high-frequency energy", J. Acoust. Soc. Am. 137 (1), Jan. 2015, pp. EL65-EL70.
Theunissen et al., "Neural processing of natural sounds", Nature Reviews, vol. 15, Jun. 2014, pp. 355-366.
Strelcyk et al., "Effects of interferer facing orientation on speech perception by normal-hearing and hearing-impaired listeners", J. Acoust. Soc. Am. vol. 135, No. 3, Mar. 2014, pp. 1419-1432.
Stelmachowicz et al., "The effect of stimulus bandwidth on auditory skills in normal-hearing and hearing-impaired children", Ear Hear, Aug. 2007, 28(4): 483-494.
Stelmachowicz et al., "High-frequency audiometry: Test reliability and procedural considerations", J. Acoust. Soc. Am., vol. 85, No. 2, Feb. 1989, pp. 879-887.
Shamma et al., "Temporal coherence and attention in auditory scene analysis", Trends in Neurosciences, Mar. 2011, vol. 34, No. 3, pp. 114-123.
Lord Rayleigh, O.M., Pres. R.S., (1908) "XVIII. Acoustical Notes.-VIII", The London, Edinburgh, and Dublin Philosophical Magazine and Journal of Science, Apr. 21, 2009, 16:92, pp. 235-246.
Lippmann, "Accurate Consonant Perception Without Mid-Frequency Speech Energy", IEEE Transactions on Speech and Audio Processing, vol. 4, No. 1, Jan. 1996, pp. 66-69.

Jongman et al., "Acoustic characteristics of English fricatives", J. Acoust. Soc. Am., vol. 108, No. 3, Pt. 1, Sep. 2000, pp. 1252-1263.
Halkosaari et al., "Directivity of Artificial and Human Speech", J. Audio Eng. Soc., vol. 53, No. 7/8, Jul./Aug. 2005, pp. 620-631.
Fullgrabe et al., "Preliminary evaluation of a method for fitting hearing aids with extended bandwidth", International Journal of Audiology, vol. 49, No. 10, Jul. 30, 2010, pp. 741-753.
Flanagan, "Analog Measurements of Sound Radiation from the Mouth", The Journal of the Acoustical Society of America, vol. 32, No. 12, Dec. 1960, pp. 1613-1620.
Dunn et al., "Exploration of Pressure Field Around the Human Head During Speech", The Journal of the Acoustical Society of America, vol. 10, Jan. 1939, pp. 184-199.
Chu et al., "Detailed directivity of sound fields around human talkers", NRC Publications Archive, IRC-RR-104, Dec. 2002, 49 pages.
Cabrera et al., "Long-Term Horizontal Vocal Directivity of Opera Singers: Effects of Singing Projection and Acoustic Environment", Journal of Voice, vol. 25, No. 6, 2011, pp. e291-e303.
Bozzoli et al., "Balloons of Directivity of Real and Artificial Mouth Used in Determining Speech Transmission Index", AES 118th Convention, Barcelona, Spain, May 28-31, 2005, pp. 1-5.
Best et al., "The role of high frequencies in speech localization", J. Acoust. Soc. Am. vol. 118, No. 1, Jul. 2005, pp. 353-363.
Badri et al., "Auditory filter shapes and high-frequency hearing in adults who have impaired speech in noise performance despite clinically normal audiograms", J. Acoust. Soc. Am., vol. 129, No. 2, Feb. 2011, pp. 852-863.
Stelmachowicz et al., "Effect of stimulus bandwidth on the perception of /s/ in normal- and hearing-impaired children and adults", J. Acoust. Soc. Am., vol. 110, No. 4, Oct. 2001, pp. 2183-2190.
Spitzer et al., "Acoustic cues to lexical segmentation: A study of resynthesized speech", J. Acoust. Soc. Am., vol. 122, No. 6, Dec. 2007, pp. 3678-3687.
Lord Rayleigh O.M. Pres.R.S., (1908) XVIII. Acoustical notes—VIII, the London, Edinburgh, and Dublin Philosophical Magazine and Journal of Science, 16:92, 235-246.
Pittman, "Short-Term Word-Learning Rate in Children With Normal Hearing and Children With Hearing Loss in Limited and Extended High-Frequency Bandwidths", Journal of Speech, Language, and Hearing Research, vol. 51, Jun. 2008, pp. 785-797.
Moreno et al., "Human head directivity and speech emission: a new approach", vol. 1, 1978, pp. 78-84.
Moore et al., "Effect of spatial separation, extended bandwidth, and compression speed on intelligibility in a competing-speech task", J. Acoust. Soc. Am., vol. 128, No. 1, Jul. 2010, pp. 360-371.
Monson et al., "Detection of high-frequency energy changes in sustained vowels produced by singers", J. Acoust. Soc. Am., vol. 129, No. 4, Apr. 2011, pp. 2263-2268.
Monson, "High-Frequency Energy in Singing and Speech", 2011,161 pages.
McKendree, "Directivity indices of Human Talkers in English Speech", Immission: Effects of Noise, Jul. 1986, 6 pages.
Marshall et al., "The Directivity and Auditory Impressions of Singers", Acustica, vol. 58, 1985, pp. 130-140.
Maniwa et al., "Acoustic characteristics of clearly spoken English fricatives", J. Acoust. Soc. Am., vol. 125, No. 6, Jun. 2009, pp. 3962-3973.
Monson et al., "The perceptual significance of high-frequency energy in the human voice", frontiers in Psychology, Jun. 2014, vol. 5, Article 587, pp. 1 to 11.
Monson et al., "Analysis of high-frequency energy in ling-term avarage spectra of singing, speech, and voiceless fricatives", J. Acoust. Soc. Am. 132(3), Sep. 2012, pp. 1754-1764.
Monson et al., "Horizontal directivity of low-and high-frequency energy in speech and singing", Special Issue: Fish Bioacoustics: Hearing and Sound Communication, vol. 132, No. 1, Jul. 2012, pp. 433-441.
Monson et al., "The maximum audible low-pass cutoff frequency for speech", J. Acoust. Soc. Am. 146(6), Dec. 2019, pp. EL496-EL501.
Liberman et al., "Toward a Differential Diagnosis of Hidden Hearing Loss in Humans", PLOS One, Sep. 12, 2016, pp. 1-15.

(56) References Cited

OTHER PUBLICATIONS

Hunter et al., "Extended high frequency hearing and speech perception implications in adults and children", Hearing Research 397 (2020), pp. 1-20.
Gamer et al., "Are You Looking at Me? Measuring the Cone of Gaze", Journal of Experimental Psychology: Human Perception and Performance, 2007, vol. 33, No. 3, pp. 705-715.
Frischen et al., "Gaze Cueing of Attention: Visual Attention, Social Cognition, and Individual Differences", Psychological Bulletin, 2007, vol. 133, No. 4, pp. 694-724.
American Auditory Society Scientific and Technology Meeting, Feb. 28-Mar. 2, 2019, 85 pages.
Chu et al., "Detailed directivity of sound fields around human talkers", NRC Publications Archive, Dec. 2002, IRC-RR-104, 49 pages.
Ching et al., "Speech recognition of hearing-impaired listeners: Predictions from audibility and the limited role of high-frequency amplification", The Journal of the Acoustical Society of America, 103 (2), Feb. 1998, pp. 1128-1140.
Bench et al., "The Bkb (Bamford-Kowal-Bench) Sentence Lists for Partially-Hearing Children", British Journal of Audiology, 1979, 13, pp. 108-112.
Barbee et al., "Effectiveness of Auditory Measures for Detecting Hidden Hearing Loss and/or Cochlear Synaptopathy: A Systematic Review", Seminars in Hearing, vol. 39, No. 2, 2018, pp. 172-209.
Apoux et al., "Relative importance of temporal information in various frequency regions for consonant identification in quiet and in noise", J. Acoust. Soc. Am. 116 (3), Sep. 2004, pp. 1671-1680.
Alexander et al., "Acoustic and perceptual effects of amplitude and frequency compression on high-frequency speech", J. Acoust. Soc. Am. 142 (2), Aug. 2017, pp. 908-923.
Yeend et al., "Working Memory and Extended High-Frequency Hearing in Adults: Diagnostic Predictors of Speech-in-Noise Perception", Ear & Hearing, vol. 40, No. 3, 2018, pp. 458-467.
Van Eeckhoutte et al., "Speech recognition, loudness, and preference with extended bandwidth hearing aids for adjult hearing aid users", International Journal of Audiology, vol. 59, No. 10, 2020, pp. 780-791.
Strelcyk et al., "Effects of interferer facing orientation on speech perception by normal-hearing and hearing-impaired listeners", J. Acoust. Soc. Am. 135 (3), Mar. 2014, pp. 1419-1432.
Smith et al., "Investigating peripheral sources of speech-in-noise variability in listeners with normal audiograms", Hearing Research 371, 2019, pp. 66-74.
Seeto et al., "Investigation of Extended Bandwidth Hearing Aid Amplification on Speech Intelligibility and Sound Quality in Adults with Mild-to-Moderate Hearing Loss", Journal of the American Academy of Audiology, vol. 29, No. 3, 2018, pp. 243-254.
Prendergast et al., "Effects of Age and Noise Exposure on Proxy Measures of Cochlear Synaptopathy", Trends in Hearing, vol. 23, 2019, pp. 1-16.
Zadeh et al., "Extended high-frequency hearing enhances speech perception in noise", PNAS, Nov. 19, 2019, vol. 116, No. 47, pp. 23753-23759.
Moore et al., "Perceived naturalness of spectrally distorted speech and music", J. Acoust. Soc. Am. 114 (1), Jul. 2003, pp. 408-419.
Moore et al., "Frequency difference limens at high frequencies: Evidence for a transition from a temporal to a place code", J. Acoust. Soc. Am. 132 (3), Sep. 2012, pp. 1542-1547.
Monson et al., "Ecological cocktail party listening reveals the utility of extended high-frequency hearing", Hearing Research 381, 2019, pp. 1-7.
Monson et al., "Detection of high-frequency energy level changes in speech and singing", J. Acoust. Soc. Am. 135 (1), Jan. 2014, pp. 400-406.
Prendergast et al., "Effects of noise exposure on young adults with normal audiograms II: Behavioral measures", Hearing Research 356, 2017, pp. 74-86.
Plomp et al., "Effect of the Orientation of the Speaker's Head and the Azimuth of a Noise Source on the Speech-Reception Threshold for Sentences", Acustica, vol. 48, 1981, pp. 325-328.
Neuhoff, "Twist and Shout: Audible Facing Angles and Dynamic Rotation", Ecological Psychology, 2003, 15(4), 335-351.
Moore et al., "Benefits of Extended High-Frequency Audiometry for Everyone", The Hearing Journal, Mar. 2017, pp. 50-55.
Moore et al., "Effect of spatial separation, extended bandwidth, and compression speed on intelligibility in a competing-speech task", J. Acoust. Soc. Am. 128 (1), Jul. 2010, pp. 360-371.
Moore et al., "Spectro-Temporal Characteristics of Speech at High Frequencies, and the Potential for Restoration of Audibility to People with Mild-to-Moderate hearing Loss", Ear & Hearing, 2008, vol. 29, No. 6, pp. 907-922.
Moore et al., "Preliminary comparison of bone-anchored hearing instruments and a dental device as treatments for unilateral hearing loss", International Journal of Audiology, Jul. 17, 2013, pp. 678-686.
Monson et al., "The perceptual significance of high-frequency energy in the human voice", Frontiers in Psychology, Jun. 2014, vol. 5, Article 587, 11 pages.
Monson et al., "Analysis of high-frequency energy in long-term average spectra of singing, speech, and voiceless fricatives", J. Acoust. Soc. Am. 132 (3), Sep. 2012, pp. 1754-1764.
McCreery et al., "The Influence of Audibility on Speech Recognition With Nonlinear Frequency Compression for Children and Adults With Hearing Loss", Ear & Hearing, vol. 35, No. 4, 2014, pp. 440-447.
McCreery et al., "The Effects of Limited Bandwidth and Noise on Verbal Processing Time and Word Recall in Normal-Hearing Children", Ear and Hearing, vol. 34, No. 5, 2013, pp. 585-591.
Crouzet et al., "On the Various Influences of Envelope Information on the Perception of Speech in Adverse Conditions: An Analysis of Between-Channel Envelope Correlation", Human and Machine Perception Research Centre, MacKay Institute of Communication and Neuroscience School of Life Sciences, 2001, 4 pages.
Arbogast et al., "Achieved Gain and Subjective Ourcomes for a Wide-Bandwidth Contact Hearing Aid Fitted Using CAM2", Ear & Hearing, vol. 40, No. 3, 2019, pp. 741-756.
Jers, "Directivity Measurements of Adjacent Singers in a Choir", 19th International Congress on Acoustics—ICA2007Madrid, 2007, 5 pages.
Crandall et al., "Analysis of the Energy Distribution in Speech", Bell System Technical Journal, vol. 19, No. 3, 1922, pp. 221-232.

\* cited by examiner

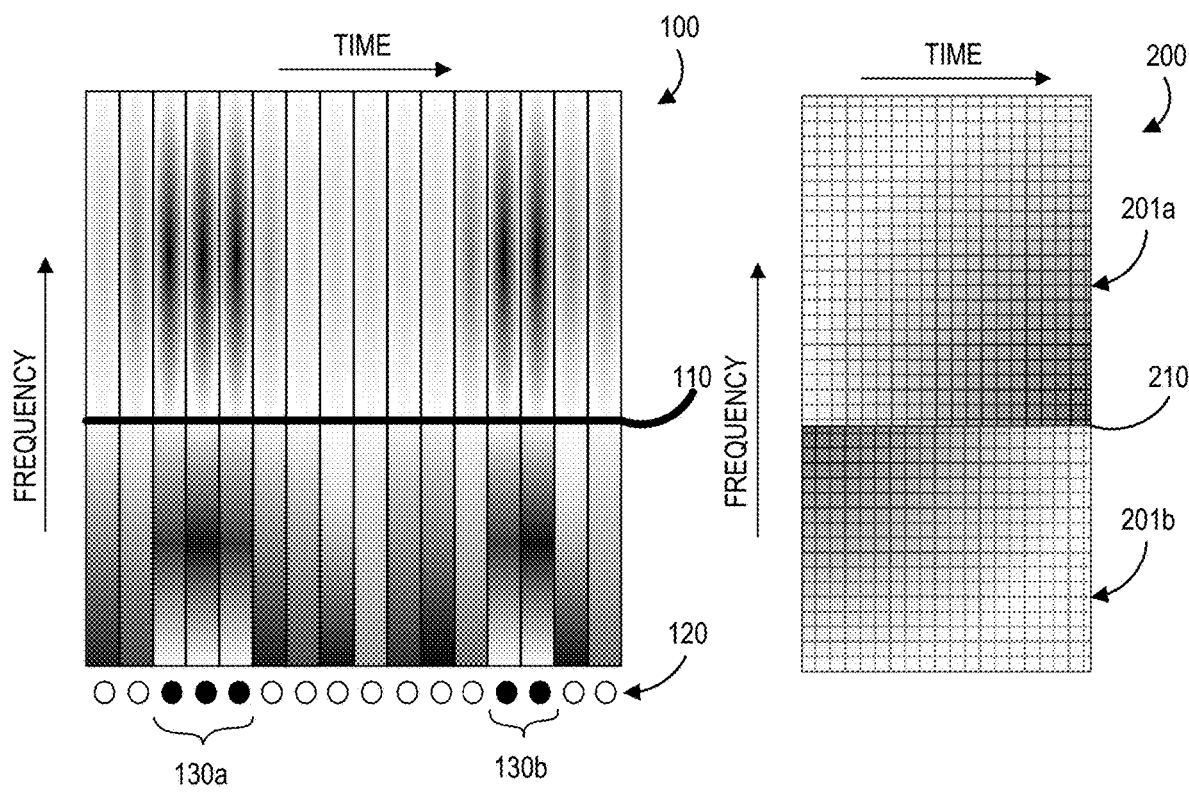
FIG. 1
FIG. 2
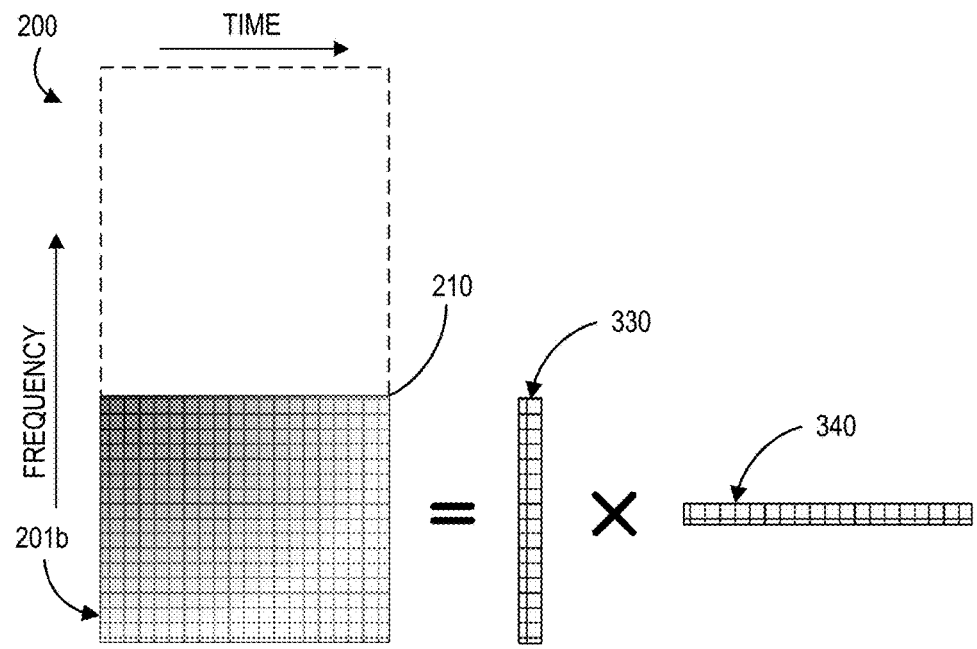
FIG. 3

SPEECH IDENTIFICATION AND EXTRACTION FROM NOISE USING EXTENDED HIGH FREQUENCY INFORMATION

CROSS-REFERENCE TO RELATED APPLICATION

This application claims priority to U.S. Provisional Patent Application No. 63/292,307, filed Dec. 21, 2021, the contents of which are incorporated by reference.

BACKGROUND

The frequency range of human hearing extends up to approximately 20 kHz for young, healthy listeners. Speech perception research has generally focused on the frequency range below about 6-8 kHz, likely because key phonetic features of speech occur in this range (e.g., vowel formants), and it is therefore understood to have the greatest influence on speech perception. The prevailing viewpoint has been that extended high frequencies (EHFs; >8 kHz) provide little information useful for speech perception.

SUMMARY

In a first aspect, a method is provided that includes: (i) obtaining a first audio sample; determining that a first portion of the first audio sample contains elevated frequency content above a first threshold frequency; (ii) based on the first portion, determining a first audio filter; (iii) subsequent to obtaining the first audio sample, obtaining a second audio sample; and (iv) applying the first audio filter to the second audio sample to generate a first audio output.

In a second aspect, a method is provided that includes: (i) obtaining a first audio sample; (ii) determining that a first portion of the first audio sample contains elevated frequency content at frequencies higher than 5.6 kilohertz; (iii) based on the first portion, determining a first audio filter by: (a) determining a first spectrogram for the first portion; and (b) performing non-negative matrix factorization to generate a first matrix and a second matrix whose product corresponds to a low-frequency portion of the first spectrogram, wherein the first matrix is composed of a set of column vectors that span along the frequency dimension of the first spectrogram, and wherein the second matrix is composed of a set of row vectors that span along the time dimension of the first spectrogram; (iv) subsequent to obtaining the first audio sample, obtaining a second audio sample; and (v) applying the first audio filter to the second audio sample to generate a first audio output by: (a) determining a second spectrogram for the second audio sample; (b) applying the first matrix to a low-frequency portion of the second spectrogram to generate a third spectrogram that represents noise content of the second audio sample; and (c) using the third spectrogram to remove the noise content from the second audio sample, thereby generating the first audio output.

In a third aspect, a method is provided that includes: (i) obtaining a first audio sample; (ii) determining that a first portion of the first audio sample contains speech; (iii) based on the first portion, determining a fundamental frequency of the frequency content of the first portion above the threshold frequency; (iv) based on the fundamental frequency, determining a first audio filter; (v) subsequent to obtaining the first audio sample, obtaining a second audio sample; and (vi) applying the first audio filter to the second audio sample to generate a first audio output.

In a fourth aspect, a non-transitory computer-readable medium is provided having stored thereon program instructions that, upon execution by a computing device, cause the computing device to perform the method of the first, second, and/or third aspects.

In a fifth aspect, a system is provided that includes at least one processor and a memory having stored thereon program instructions that, upon execution by the at least one processor, cause the at least one processor to perform the method of the first, second, and/or third aspects.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

The patent or application file contains at least one drawing executed in color. Copies of this patent or patent application publication with color drawings will be provided by the Office upon request and payment of the necessary fee.

FIG. 1 illustrates aspects of an input audio signal, according to example embodiments.

FIG. 2 illustrates aspects of an input audio signal, according to example embodiments.

FIG. 3 illustrates aspects of an input audio signal and signal processing method, according to example embodiments.

DETAILED DESCRIPTION

Figure 4:
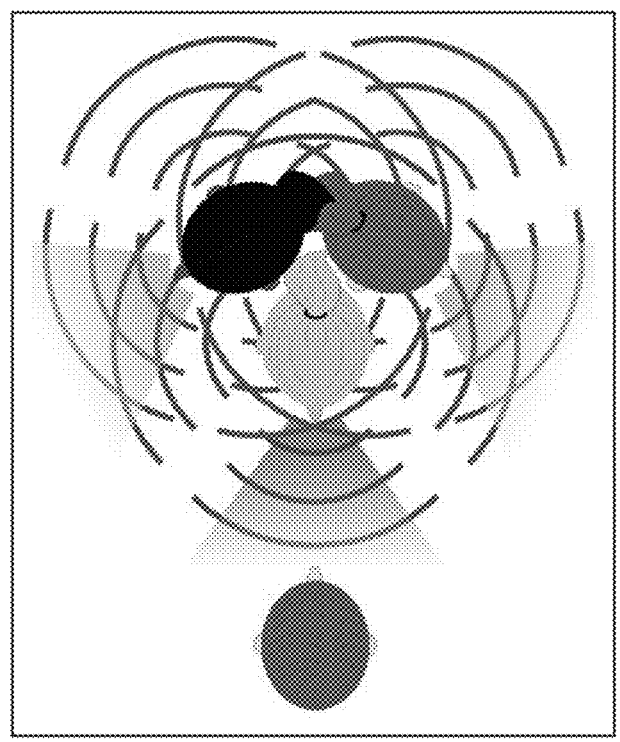
FIG. 4 shows an example experimental arrangement of simulated Target (Blue) and Maskers (Gray) used to generate some of the experimental results provided herein. Target and Masker simulated speech sounds were presented from a single loudspeaker in front of the listener.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

It is desirable in a variety of applications to selectively amplify target speech in an audio signal without also amplifying noise in the audio signal. However, this is a difficult problem, especially when the 'noise' includes non-target speech (e.g., from 'masking' voices present in the same environment as a 'target' voice). While a variety of computationally expensive methods (e.g., large machine learning models) can be used, such solutions are not compatible with execution on hearing aids or other size-constrained assistive devices, which have limited local computational resources (e.g., due to limited power, memory, or processor resources available in the hearing aid or other size-constrained assistive device).

The systems and methods described herein provide computationally inexpensive methods for generating and applying improved audio filters that are adapted to the signal and noise characteristics of input audio signals (e.g., to properties of audio propagation between speaker(s) and/or noise sources and a microphone, to spectral or other properties of speech and/or noise sources) and that can be used to provide improved extraction of target speech from other noise content (e.g., environmental noises, non-target speech) in an audio signal. These improved filters can be implemented on hearing aids or other resource-limited assistive devices (e.g., smartphones operating alone or in concert with hearing aids or other assistive devices) and can be updated repeatedly over time to adapt to changes in the channel properties of an environment and/or to changes in the properties of sources of target speech and noise.

Previously, high-frequency audio signal contents (e.g., higher than 6 kHz, 7 kHz, or 8 kHz) have been discarded when detecting, extracting, amplifying, or otherwise processing speech in audio signals. In many scenarios, the lower-frequency content (e.g., content below 6 kHz) is sufficient to recover speech information (e.g., the identity of any spoken words in the audio signal), so discarding the higher-frequency content prior to subsequent audio processing (e.g., prior to filtering and amplification for emission via a speaker of a hearing aid) has allowed for speech recognition to occur based on audio signal processed in such a manner.

However, certain speech sounds (e.g., voiceless fricatives, sounds corresponding to other consonants) exhibit high-frequency contents (e.g., content at extended high frequencies (EHFs), which are sometimes defined as frequencies>8 kHz). Such time-varying high-frequency audio signal contents, above a threshold frequency (e.g., above a threshold frequency of 6 kHz, 7 kHz, or 8 kHz), can be used to detect that speech is present, to determine an envelope of the speech (e.g., a time-varying envelope representing the time-varying energy of target speech at a variety of frequencies), to determine the contents of the speech (e.g., the words represented by the speech), or to determine some other information about speech in an audio signal. Such high-frequency speech contents are particularly present for speech directed toward a receiver (e.g., a microphone, a listener's ear(s)), relative to speech not directed toward the receiver (e.g., from 'masking' speakers that are also present in an environment that includes a 'target' speaker speaking toward the receiver). Thus, such high-frequency audio signal content can be valuable in detecting, extracting, amplifying, or otherwise processing target speech in the presence of noise, in particular, in the presence of noise that includes non-target speech that is not directed, spatially, toward a receiver.

For example, frequency contents of an input audio signal above a threshold frequency could be used to determine that target speech is present and/or that a particular type of target speech is present (e.g., voiceless fricatives). In response to that determination, the portion(s) of the audio signal corresponding to the detected speech could be used to generate audio filter(s) that can then be used to extract target speech from noise in subsequent portions of the audio signal (e.g., to preferentially amplify target audio for emission from a speaker of a hearing aid). In another example, frequency contents of an input audio signal above a threshold frequency could be used to determine a time-varying envelope, spectrum, or other information about target speech and that determined information could then be used to extract target speech from noise in the audio signal. Additional or alternative methods for using such high-frequency audio signal contents are possible, as described elsewhere herein.

The presence of target-speech-related signals in the high-frequency content of an input audio signal could be detected in a variety of ways. For example, the time-varying level of energy present in such high-frequency signal contents could be determined directly and the presence of target-speech-related signals could be detected when the energy exceeds a threshold energy level. This could include determining a spectrum, spectrogram, or other spectral transform or information from the audio signal and then summing the high-frequency portion(s) of the spectral information to determine the energy present in the high-frequency contents (e.g., summing across all frequency contents above a threshold frequency, summing frequency contents within one or more specified bands of frequencies above the threshold frequency). In another example, the input audio signal could be high-passed, band-passed, or otherwise filtered to extract signal contents above the frequency threshold (e.g., high-passed with a cutoff set equal to the threshold frequency) and the energy in the filtered output signal then determined (e.g., by envelope detection, root-mean-square filtering, or some other method for determining the overall energy content of a signal).

In some examples, the presence of target-speech-related signals in the high-frequency content of an input audio signal could be detected indirectly. For example, the zero-crossing rate of the input audio signal and the total signal energy level could be determined over time (e.g., a plurality of times, once for each sequential, non-overlapping frame of the audio signal) and, whenever the zero-crossing rate exceeds a threshold zero-crossing rate and the total signal energy level exceeds a threshold energy level, it could be determined that target-speech-related signals are present in the high-frequency content of the input audio signal. The total signal energy level could be determined in a variety of ways, e.g., by filtering the signal using a root-mean-square filter, by applying a rectifier or other envelope-determining filter to the signal and then applying a lowpass filter to the output of the envelope-determining filter, or some other signal energy-determining method. The use of zero-crossing rate and total signal energy level in combination is a very computationally low-cost way to detect the presence of target-speech-related signals in the high-frequency content of an input audio signal.

Once such target-speech-related signals have been detected in the high-frequency content of an input audio signal, those portions of the input audio signal determined to contain such content can be used to generate audio filter(s) to extract target speech from the audio signal (e.g., from portions of the audio signal subsequent to a portion determined to contain target-speech-related content). The portion of the input audio signal used to generate the audio filter(s) could be a set amount of the input audio signal following an initial detection of target-speech-related content (e.g., a first frame of audio during which such content is detected, a set duration of audio subsequent to a first sample when such content is detected).

Alternatively, the portion of the audio signal used to generate the audio filter(s) could be an entire contiguous portion of the audio signal during which such content is detected (e.g., the entirety of a contiguous portion of the audio signal that demonstrates both super-threshold zero-crossing rates and super-threshold total signal energy). For example, the input audio signal could be divided into a sequence of non-overlapping frames of audio, each frame representing a plurality of samples of the input audio signal. Each such frame could be, e.g., between 15 milliseconds and 50 milliseconds long. For each frame, it could be determined whether the audio signal in the frame contains elevated frequency content above a threshold frequency (and thus that the frame is more likely to contain target-speech-related content). When it is determined that a frame contains such elevated high-frequency content, the portion of the input audio signal that includes that frame and any contiguous subsequent frames that also exhibit elevated high-frequency content could be used to determine the audio filter(s).

FIG. 1 illustrates a schematic representation of the frequency contents of an input audio signal 100 across frequency (along the "FREQUENCY" axis) and across time (along the "TIME" axis). The input audio signal 100 is divided into a plurality of non-overlapping frames (vertical boxes, with shading therein representative of frequency contents of individual frames as a function of frequency and time). The frequency of a threshold frequency 110 is indicated by the bold horizontal line. The contents of each frame could then be used to determine whether each frame contains elevated frequency contents above the threshold frequency 110 (e.g., directly by determining the energy at one or more frequencies above the threshold frequency, and/or indirectly by determining zero crossing rate and total signal energy of the audio signal within the frame). The results of such a determination are indicated in FIG. 1 by the circles 120; filled circles indicate that the corresponding frame was determined to include elevated frequency content above the threshold frequency 110, while open circles indicate that the corresponding frame was determined to not include elevated frequency content above the threshold frequency 110. Here, references to speech signals having no frequency content above the threshold frequency can mean that there actually is no frequency content above this threshold, or that the amount of frequency content above the threshold is minor, insignificant, or otherwise determined to not represent the sort of speech- and/or noise-related content that is useful for generating audio filter or performing other audio processing as described herein.

As depicted by way of example in FIG. 1, an input audio signal may exhibit elevated frequency content above a threshold frequency multiple times (e.g., as a source of target speech emits discrete voiceless fricatives over time). Accordingly, the audio filters used to filter, amplify, or otherwise extract target speech from the audio signal may be updated again and again, each time it is determined that the audio signal has exhibited elevated frequency content above the threshold frequency.

This could be done simply, e.g., by determining the audio filter each time a period of elevated high-frequency content is detected based only on the portion of the input audio signal that was most recently detected to exhibit such elevated high-frequency contents. So, a first filter could be determined based on the portion 130a of the audio signal 100 that corresponds to the first contiguous subset of the frames of the audio signal determined to exhibit elevated frequency contents above the threshold frequency 110. This first filter could be applied to filter the subsequent portion of the audio signal 100 that does not exhibit elevated contents above the threshold frequency 110 (i.e., until the portion 130b of the audio signal 100 that corresponds to the second contiguous subset of the frames of the audio signal determined to exhibit elevated frequency contents above the threshold frequency 110). Once it is determined that the audio signal 100 has exhibited elevated content above the frequency threshold 110 again (i.e., at the beginning of portion 130b of the signal 100), a second audio filter could be determined based on the portion 130b of the audio signal 100 that corresponds to the subsequent, second contiguous subset of the frames of the audio signal determined to exhibit elevated frequency contents above the threshold frequency 110. This second filter could then be applied to filter the portion of the audio signal 100 that does not exhibit elevated contents above the threshold frequency 110 subsequent to the second portion 130b.

Alternatively, information from multiple portions of the input signal exhibiting elevated content above a threshold frequency could be used to generate an audio filter. This could be done to prevent an erroneous detection period from generating a poor-quality filter (e.g., due to the erroneous filter containing high-frequency noise signals rather than high-frequency speech content), to increase the information available for generating the filter (thereby improving the quality of the filter and/or allowing more complex filter algorithms to be applied), to reduce the 'noise' present in the generated filter parameters, or to provide some other benefits. Information from multiple elevated-high-frequency-content portions of an input audio signal can be used in a variety of ways to generate improved audio filters.

In some examples, each elevated-high-frequency-content portion of the input audio signal could be used to generate a respective audio filter. When a new audio filter is generated in this manner (based on a newly-detected period of elevated high frequency content in the signal), a composite audio filter could then be determined based on the new audio filter and one or more audio filters generated from prior periods of elevated high frequency content in the signal. The composite filter could be generated from one or more constituent audio filters by, e.g., averaging parameters of the constituent filters, summing the outputs of the constituent filters, averaging the frequency responses of the constituent filters, or combining the constituent filters in some other way (e.g., in a weighted manner, with more recently-generated filters weighted to a greater degree so as to have increased influence on the behavior of the composite filter).

In another example, a buffer of portions of the audio signal that exhibit elevated high-frequency content could be maintained. Each time a new period of the audio signal is determined to exhibit elevated high-frequency content, the new period could be added to the buffer and the oldest portion(s) of the buffer removed to update the buffer. A new audio filter could then be determined based on the contents of the updated buffer. In an example, removing the oldest portion(s) of the buffer could include removing the oldest contiguous portion of the input audio signal in the buffer. In another example, removing the oldest portion(s) of the buffer could include removing the oldest contents of the buffer, with the amount removed having a duration equivalent to the duration of the newly-detected contiguous portion of the input signal that exhibits elevated high-frequency content (thus allowing the buffer to have a constant length).

In yet another example, one or more previously-generated audio filters could be used as a staring 'seed' for the generation of a new audio filter based on a newly-detected portion of the input signal that exhibits elevated high-frequency content. For example, if generation of the audio filter involves an iterative process (e.g., gradient descent), then the previously-generated filter could be used as a 'starting state' for the iterative process. For example, generation of the audio filter could include performing non-negative matrix factorization of a part of a spectrogram of the input audio signal (e.g., a part of the spectrogram below a threshold frequency), and then using one of the factorized matrices (e.g., the one of the factorization matrices that spans the frequency dimension of the part of the spectrogram) to filter subsequent input audio signals. Generation of a subsequent audio filter could include performing non-negative matrix factorization of a part of a spectrogram of a subsequent portion of the input audio signal, with an initial seed state for one of both of the factorized matrices being set as the corresponding factorized matrix from the previous audio filter.

Once a portion of an input audio signal has been determined to contain elevated frequency content above a threshold frequency (e.g., via one or more of the methods described herein), and thus is likely to contain target speech content, an audio filter for the amplification, extraction, or other processing of the target speech in subsequent portions of the audio signal can be determined. A variety of methods for determining such an audio filter are possible, leveraging a variety of information contained in the portion of the audio signal above and/or below the frequency threshold.

In one example, the content of the signal above the frequency threshold could be assumed to primarily contain contents related to target speech. Accordingly, the content of the signal above the frequency threshold could be used to, e.g., determine a fundamental frequency for the target speech. This could be done by, e.g., determining a spectrum, spectrogram, or other spectral information about the signal and then detecting the presence, location, shape, and/or other information about one or more peaks present in the spectral information to determine the fundamental frequency. The determined fundamental frequency can then be used to generate an audio filter. This could be done by, e.g., using the fundamental frequency to generate an audio filter that emphasizes and/or preferentially passes contents of an input audio signal at or near the fundamental frequency and all of its harmonics while preferentially stopping other contents of the input audio signal.

In another example, the presence of elevated frequency content above the threshold frequency could imply that target speech is present and that the speech, while the high-frequency content is elevated, represents a voiceless fricative or other speech sound characterized by minimal or no energy at low frequencies. Accordingly, the content of the signal below a frequency threshold (e.g., the same frequency threshold used to determine whether the audio signal contains target speech) could be used to determine an audio filter in order to selectively reduce, attenuate, or otherwise reduce similar signal content in subsequently-obtained input audio signals (which, per the above assumption, is likely to contain environmental noise, masking speech, or other non-target-speech contents).

By way of illustration, FIG. 2 depicts an example representation of the contents of an input audio signal 200 across frequency (along the "FREQUENCY" axis) and across time (along the "TIME" axis). The input audio signal could be represented by a spectrogram or other two-dimensional representation of the contents of the signal at various frequencies as they vary across time. The input audio signal 200 could be a portion of an audio signal determined to have elevated frequency contents above a threshold frequency 210 (such elevated high-frequency contents represented by a high-frequency part 201a) and thus to be useful in determining an audio filter to extract target speech in subsequently-obtained audio signals. The portion of the spectrogram (or other temporo-spectral representation) of the input audio signal 200 below the threshold frequency 210 (such low-frequency contents represented by a low-frequency part 201b) could be used to generate an audio filter to amplify or otherwise selectively extract target speech from the input audio signal by, e.g., defining the audio filter to filter out contents of the input audio signal similar to those represented by the low frequency part 201b of the signal 200.

The low frequency part 201b of the signal 200 could be used in a variety of ways to generate such an audio filter. This could include generating a spectrogram or other two-dimensional temporo-spectral representation of the input signal 200 and then generating the audio filter therefrom (e.g., from the sub-frequency-threshold portions thereof). Additionally or alternatively, a lowpass filter or other filter could be used to remove the supra-frequency-threshold content of the input signal and the output thereof could be used to generate the audio filter. In some examples, an adaptive filter could be generated, based on the low frequency part 201b, to attenuate signals that are similar in the time and/or frequency domain to the signal contents of the low frequency part 201b. In yet other examples, an average spectrum of the low frequency part 201b could be determined and an audio filter generated to cancel or otherwise reduce signal contents corresponding to the average spectrum.

In some examples, non-negative matrix factorization or some other factorization or dimensionality-reduction method (e.g., independent components analysis) could be used on a spectrogram (or similar two-dimensional representation) of the low frequency part 201b to generate a lower-dimensional representation of the noise content in the low frequency part 201b (e.g., a matrix composed of a set of basis vectors that span along the frequency dimension of the spectrogram of the low frequency part 201b). This lower-dimensional representation can then be used to determine the 'noise' component of subsequently-obtained audio signals so that such noise content can be removed (e.g., to allow a hearing aid or other assistive device to preferentially amplify target speech in the audio signal while attenuating masking speech or other noise in the audio signal).

FIG. 3 depicts aspects of an example in which the portion of the spectrogram of the input signal 200 representing the low frequency part 201b is subjected to non-negative matrix factorization. The non-negative matrix factorization results in a first matrix 330 and a second matrix 340 whose product approximate the spectrogram of the low frequency part 201b. The first matrix 330 is composed of a set of column vectors that span along a frequency dimension of the spectrogram, and the second matrix 340 is composed of a set of row vectors that span along a time dimension of the spectrogram. The inner dimension of the matrices 330, 340, and thus the number of column vectors that represent the lower-dimensional bases of the signal noise content, can be limited in order that the column vectors preferentially represent the temporo-spectral properties of the signal noise content. For example, the number of column vectors could be less than or equal to 10.

Once the first matrix 330 has been determined, it can be used to implement an audio filter to filter subsequently-obtained input audio signals. This could include determining a spectrogram (or similar two-dimensional representation) of the input audio signal, and then applying the first matrix 330 to determine a set of row vectors representing the 'activation' of the bases represented by the column vectors of the first matrix 330 within the spectrogram over time (e.g., via a maximum-likelihood estimation or other methods of factorizing the spectrogram of the input audio signal into a basis matrix (which is held constant as the first matrix 330) and a matrix of activation vectors). A spectrogram representing the noise content of the audio signal could then be determined (e.g., as the product of the first matrix 330 and the newly-determined activation vectors) and used to remove the noise content from the input audio signal. This could include determining a spectrogram for the input audio signal, subtracting the determined noise spectrogram therefrom, and then performing an inverse transform of the difference to result in a time-domain signal that represents the target speech content of the input audio signal. Alternatively, an inverse transform could be performed on the noise spectrogram to generate a time-domain noise signal, and the time-domain noise signal could be subtracted from the time-domain input audio signal to generate a time-domain signal that represents the target speech content of the input audio signal.

These as well as other aspects, advantages, and alternatives will become apparent to those of ordinary skill in the art by reading this detailed description with reference where appropriate to the accompanying drawings. Further, it should be understood that the description provided in this section and elsewhere in this document is intended to illustrate the claimed subject matter by way of example and not by way of limitation.

II. EXPERIMENTAL DATA

Extended high frequencies (EHFs; which are sometimes defined as frequencies>8 kHz) in speech are not only audible but also have some utility for speech recognition, including for speech-in-speech recognition when maskers are facing away from the listener. However, the contribution of EHF spectral versus temporal information to speech recognition was previously unknown. Here, we show that access to EHF temporal information improved speech-in-speech recognition relative to speech bandlimited at 8 kHz and that additional access to EHF spectral detail provided an additional small but significant benefit. Results detailed herein suggest that both EHF spectral structure and temporal envelope contribute to the observed EHF-related benefits. Speech recognition performance was sensitive to masker head orientation, with a rotation of only 15° providing a significant benefit. Additional analysis indicated that pure-tone thresholds at EHFs are better predictors of speech recognition performance than low-frequency pure-tone thresholds.

The frequency range of human hearing extends up to approximately 20 kHz for young, healthy listeners. Speech perception research has generally focused on the frequency range below about 6-8 kHz, likely because key phonetic features of speech occur in this range (e.g., vowel formants), and this range of frequencies is therefore perceived to have a large influence on speech perception. The prevailing viewpoint has been that extended high frequencies (EHFs; >8 kHz) provide little information useful for speech perception. Accordingly, the audibility of speech frequencies below 8 kHz and corresponding effects on speech perception have been studied extensively over the past several decades. In contrast, the audibility of higher frequency bands and corresponding effects on speech recognition have been studied far less.

The EHF range in speech is audible and has some utility for speech perception. For example, the average young, normal-hearing listener can detect the absence of speech energy beyond approximately 13 kHz, although listeners with better 16-kHz pure-tone thresholds can detect losses at even higher frequencies. It has also been demonstrated that EHF audibility contributes to speech localization, speech quality, talker head orientation discrimination, and speech recognition in the presence of background speech and noise.

Access to EHFs in speech supports speech-in-speech listening when the target talker is facing the listener and collocated maskers are facing away from the listener. This listening scenario departs from the traditional experimental design but reflects a more realistic 'cocktail party' listening environment where the talker of interest is typically facing the listener and background talkers are typically facing other directions. FIG. 4 illustrates an example of such a scenario, with a single target talker (facing vertically downward in the figure) facing a listener (facing vertically upward in the figure) and two masking talkers facing slightly away from the listener, in opposite directions. The experimental approach used to generate the results provided herein was designed to evaluate whether rotated maskers result in less masking speech content at the highest frequencies, as measured by a listener. Because directivity patterns of speech radiation are frequency dependent, low frequencies radiate more omnidirectionally around a talker's head and high frequencies radiate more directionally (e.g., with less horizontal spread away from the front of the talker). This increasing directionality at higher frequencies can cause rotation of a masker's head to face away from the listener to effectively low-pass filter the masker speech signal as received at the ear of the listener, providing potential spectral cues to the auditory system for detection and segregation of a target speech signal (that is directed toward the listener, and thus may contain elevated high-frequency content) amidst masker speech signals (which are directed away and so may include reduced high frequency content). Under these conditions, it was observed that providing access to full-band speech improved normal-hearing listeners' speech-in-speech recognition performance relative to speech that was bandlimited at 8 kHz.

These results suggest that EHF energy in speech conveys information regarding the speech signal. A variety of types of information provided by EHFs could act to provide these observed benefits to speech recognition. One possibility is that EHF temporal information (e.g., the temporal envelope of the EHF) serves as a segregation and grouping cue, facilitating segregation of phonetic information in the lower-frequency received sound. This is possible because high-frequency energy in speech is at least partially temporally coherent with low-frequency energy. Temporal coherence facilitates the grouping of sound features into a single stream, improving sound segregation for auditory scene analysis, and it has been demonstrated that temporal (envelope) information becomes increasingly important for higher frequency bands when engaging in speech recognition in the presence of noise. Another possibility is that EHF spectral detail per se provides phonetic information. EHF spectral energy does provide information useful for phoneme identification when low-frequency information is absent or severely degraded. However, it may be that phonetic information provided by EHFs is redundant with phonetic information provided by lower frequencies and may not be useful when phonetic information at low frequencies is accessible. Indeed, the likelihood of this redundancy is supported by the history of speech intelligibility research, which resulted in models predicting negligible contribution from frequencies above 7 kHz for speech recognition when low and/or midrange frequencies are accessible.

There is evidence that listeners with clinically normal audiograms but poorer pure-tone thresholds at EHFs have diminished speech-in-noise abilities. It has been shown that listeners who self-reported and exhibited speech-in-noise difficulties had elevated EHF thresholds at 12.5 and 14 kHz compared with a control group. Group-level differences in self-reported speech-in-noise difficulty have also been observed, with greater likelihood of reporting difficulty for groups with more severe EHF hearing loss (measured at 10, 12.5, 14, and 16 kHz). A correlation between EHF pure-tone averages (PTAs) and speech-in-noise scores have also been observed when the noise masker was a broadband speech-shaped noise, although no such relationship was observed when the noise masker was bandlimited to 8 kHz. It has been found that EHF PTAs (measured from 9 to 12.5 kHz) correlated with a composite speech score derived from both self-reported difficulty and objective speech-in-noise assessments.

EHF hearing loss could potentially be a diagnostic or predictive factor for speech-in-noise difficulty, though prior studies have failed to find a relationship between EHF thresholds and speech-in-noise performance. For example, it has been found that, although group-level differences in EHF thresholds (measured at 9, 10, 11.2, 12.5, 14, and 16 kHz) were present between individuals at high risk versus low risk for cochlear synaptopathy, EHF PTAs did not predict speech-in-noise performance. However, that study used speech materials that were bandlimited at 8.8 kHz. Similarly, a study found no relationship between EHF PTAs (measured at 10, 12.5, and 14 kHz) and speech-in-noise scores, although listeners in that study all had relatively good EHF thresholds. It has been reported that speech-in-noise performance was predicted by statistical models that included 16-kHz thresholds as predictors, along with age and noise exposure. However, replacing the 16-kHz threshold with pure-tone thresholds at standard audiometric frequencies as predictors resulted in improved model predictions. Thus, there are mixed findings on the relationship between EHF pure-tone thresholds and speech-in-noise difficulty.

Taking into consideration the effects of directivity of speech radiation, it was demonstrated that better 16-kHz thresholds were associated with better speech-in-noise scores when maskers were facing away from the listener while the target talker was facing the listener. However, there was no relationship between 16-kHz thresholds and speech-in-noise scores when maskers and the target talker were all facing the listener. As described earlier, the rotating of the maskers' heads introduces low-pass filtering effects, increasing the salience of EHF acoustic features for the target speech. Notably, listeners in that study had clinically normal audiograms but exhibited EHF pure-tone thresholds ranging from −20 to 60 dB HL.

The experimental assessments described herein determined whether access to temporal information alone in the EHF speech band provided a benefit for speech-in-speech listening, and whether access to spectral detail provided any additional benefit. The effect of a change in masker head orientation was assessed, hypothesizing that maskers that were facing further away from the listener would lead to improved performance. In addition, the question was investigated of whether better pure-tone thresholds predicted better performance in the speech-in-speech experimental task described herein for a group of listeners who had normal hearing at both standard audiometric frequencies and EHFs.

Forty-one participants (six male), ages 19-25 years (mean=21.3 years), participated in the experiment described herein. Participants had normal hearing across the frequency range of hearing, as indicated by pure-tone audiometric thresholds better than 25 dB HL in at least one ear for octave frequencies between 0.5 and 8 kHz and EHFs of 9, 10, 11.2, 12.5, 14, and 16 kHz.

The masker stimuli consisted of two-female-talker babble with both talkers facing 45° or both talkers facing 60° relative to the listener. Masker stimuli were generated using recordings made at angles to the right of the talkers, taken from a database of high-fidelity (44.1-kHz sampling rate, 16-bit precision) anechoic multichannel recordings. Left-right symmetry in speech radiation from the talker was assumed during the recording process. A semantically unpredictable speech babble signal was created for each angle. Target speech stimuli were the Bamford-Kowal-Bench sentences recorded by a single female talker in a sound-treated booth using a class I precision microphone located at 0°, with 44.1-kHz sampling rate and 16-bit precision.

Figure 5:
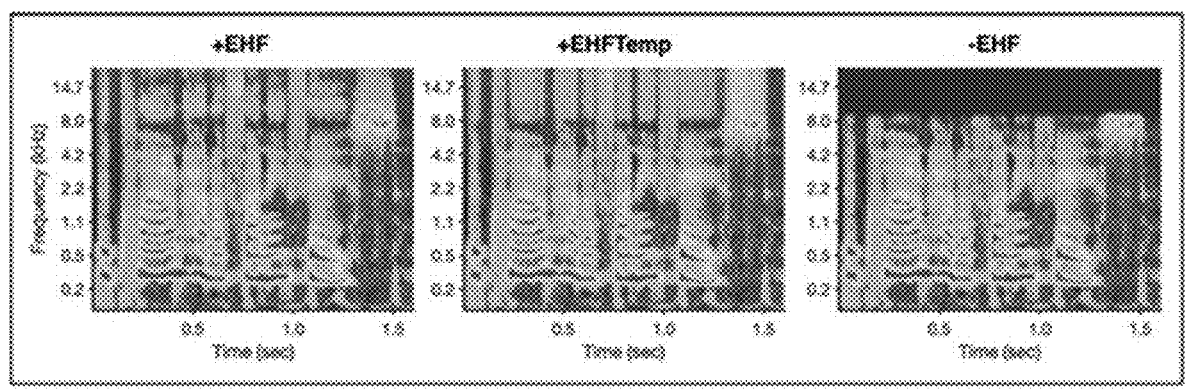
FIG. 5 shows cochleograms of the Female Target Talker Phrase, "The Clown Had a Funny Face." Three filtering conditions are shown: the full-band signal (+EHF; left), the signal with EHF spectral detail removed, but EHF temporal envelope preserved (+EHFTemp; middle), and the signal low-pass filtered at 8 kHz (−EHF; right). EHF=extended high frequency.

Three filtering schemes were used. For the low-pass filtered condition, all stimuli were low-pass filtered using a 32-pole Butterworth filter with a cutoff frequency of 8 kHz. For the full-band condition, all stimuli were low-pass filtered at 20 kHz. For the third condition, designed to preserve temporal EHF information while removing EHF spectral detail, the amplitude envelope of the EHF band of each target and masker stimulus was extracted by (a) high-pass filtering at 8 kHz using a Parks-McClellan equiripple finite impulse response (FIR) filter, (b) computing the Hilbert transform of the high-pass filtered signal, and (c) low-pass filtering the magnitude of the Hilbert transform at 100 Hz. Each 8-kHz low-pass filtered target and masker stimulus was then summed with a spectrally flat EHF noise band (8-20 kHz) that was amplitude modulated using the envelope of the EHF band (i.e., a single-channel vocoded EHF band) corresponding to that stimulus. FIG. 5 depicts example spectrograms illustrating each of these experimental conditions.

Stimuli were presented to listeners using a KRK Rokit 8 G3 loudspeaker at 1 m directly in front of the listener seated in a sound-treated booth. The level of the two-talker masker was set at 70 dB sound pressure level at 1 m, while the level of the target was adaptively varied. Two interleaved adaptive tracks were used, each incorporating a one-down, one-up adaptive rule. For one track, the signal-to-noise ratio (SNR) was decreased if one or more words were correctly repeated; otherwise, the SNR was increased. For the second track, the SNR was decreased if all words or all but one word were correctly repeated; otherwise, the SNR was increased. Both tracks started at an SNR of 4 dB. The SNR was initially adjusted in steps of 4 dB and then by 2 dB after the first reversal. Each of the two tracks comprised 16 sentences. Word-level data from the two tracks were combined and fitted with a logit function with asymptotes at 0 and 100% correctness. The speech reception threshold (SRT) was defined as the SNR associated with 50% correctness. Data fits were associated with r2 values ranging from 0.50 to 0.99, with a median value of 0.85.

Three filtering conditions were tested: full band (+EHF), full band with only EHF temporal information (+EHFTemp), and low-pass filtered at 8 kHz (−EHF). Two masker head orientation conditions were tested: both maskers facing 45° or both maskers facing 60° relative to the target talker. Following a single training block consisting of 16 sentences, the six conditions (three filtering conditions× two masker head angles) were tested in separate blocks with block order randomized across participants. The starting sentence list number was randomized for each participant and continued in numerical order of the Bamford-Kowal-Bench sentence lists.

Statistical analysis consisted of a two-way repeated-measures analysis of variance (ANOVA) to assess the effect of filtering condition and masker head angle. Univariate Pearson's correlation was used to assess the relationship between pure-tone thresholds and task performance. Statistical analyses were conducted using the ezANOVA and corr functions in R. Custom scripts written in MATLAB were used for signal processing and experimental control.

Figure 6:
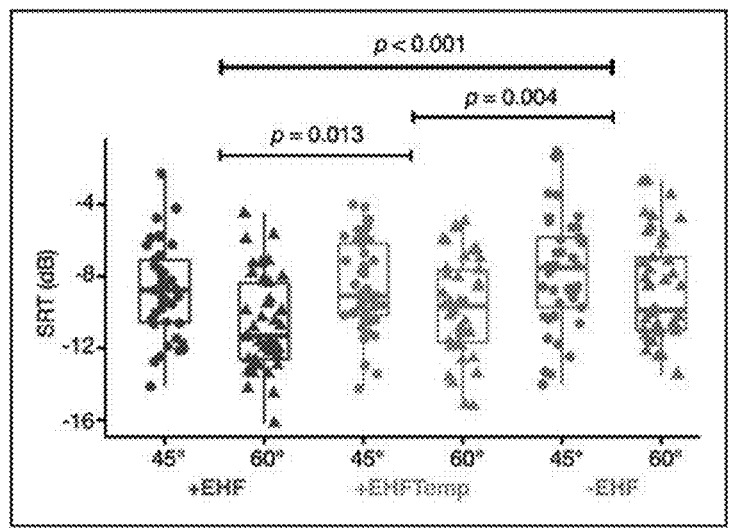
FIG. 6 shows SRTs for the three filtering conditions and two masker head orientations. SRTs=speech reception thresholds.

There was a main effect of filtering condition, with mean SRTs of −9.7, −9.2, and −8.3 dB (medians −9.9, −9.4, and −8.6 dB) for the +EHF, +EHFTemp, and −EHF conditions, respectively—two-way repeated-measures ANOVA, $F(80, 2)=15.8$, $p<0.001$. The data contributing to these analyses are depicted in FIG. 6. Post hoc pairwise comparisons (Holm-Bonferroni corrected) revealed a significant difference between all EHF conditions (corrected $p<0.05$ for all comparisons; see FIG. 6). There was a main effect of masker head orientation, with mean SRTs of −8.4 and −9.7 dB (medians −8.7 and −10.2 dB) for the 45° and 60° conditions, respectively, $F(40, 1)=39.4$, $p<0.001$, and no interaction between filtering condition and masker head orientation ($p=0.2$).

Figure 7:
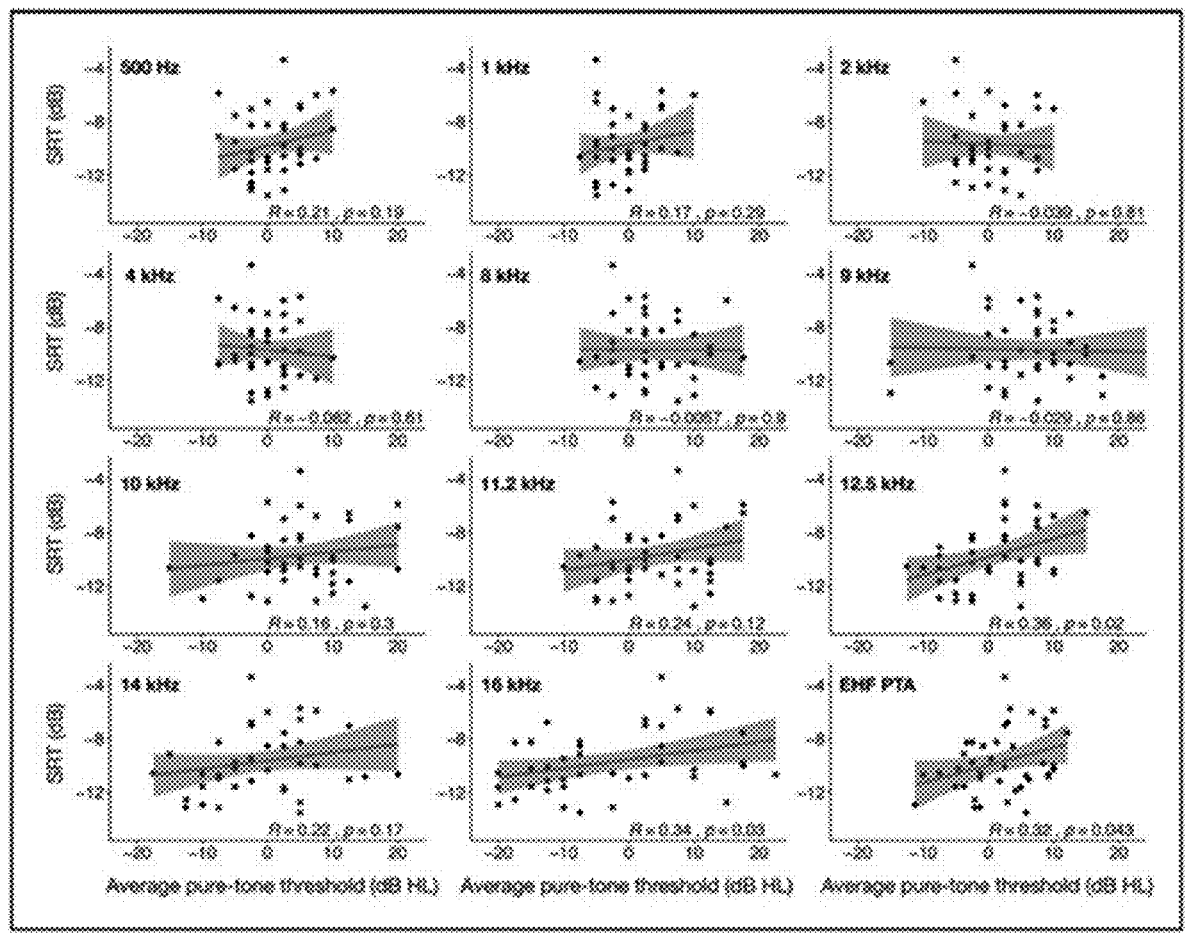
FIG. 7 shows mean SRTs for the +EHF condition plotted against pure-tone thresholds averaged across both ears. Shading represents 95% confidence intervals. Displayed p values are not corrected for multiple comparisons. PTA=pure-tone average.

An exploratory analysis was conducted to assess whether pure-tone thresholds across the frequency range of hearing predicted performance in the full-band task. The results of this assessment are depicted in FIG. 7. The 12.5-kHz, 16-kHz, and EHF PTA (9-16 kHz) exhibited the highest correlation coefficients (Pearson's $r>0.3$) between full-band (+EHF) task performance (averaged across masker head angles) and left-right-averaged pure-tone thresholds.

It was found that access to EHFs in speech improves normal-hearing listeners' speech-in-speech recognition performance relative to speech bandlimited at 8 kHz. The improvements observed in the present study between the +EHF and −EHF conditions were of similar magnitude to those reported previously. These findings continue to support the use of high-fidelity speech materials when testing and/or simulating speech-in-speech environments as information at EHFs is audible and useful for speech recognition for normal-hearing listeners.

The results support the hypothesis that spectral detail at EHFs provides benefit for listeners beyond that provided by EHF temporal information alone. These results lend support for this hypothesis as a significant decrease in speech recognition was observed when spectral detail was removed and only temporal (i.e., envelope) information from the EHF band was provided to listeners. The size of this effect was small (0.5 dB on average), whereas EHF temporal information alone provided 0.9 dB of benefit, on average. Thus, these data suggest that EHF temporal information may account for a larger proportion of the EHF benefit, but the full complement of EHF benefit only occurs when additional spectral detail is also available. This finding highlights the exquisite sensitivity of the human auditory system to EHFs in speech, despite poorer frequency discrimination ability, poorer pure-tone audibility, and larger widths of auditory filters beyond 8 kHz.

These findings lend credence to the idea that EHFs provide phonetic information useful for speech-in-speech recognition rather than purely serving as a target speech segregation cue. This is possible because individual phonemes, such as voiceless fricatives, exhibit distinctive spectral features at EHFs (e.g., energy peak loci, spectral slopes) sufficient to facilitate phoneme recognition, especially for consonants. This finding is of importance for potential amplification of EHFs in hearing devices. For example, if EHFs were to be represented in cochlear implants, these data suggest that devoting more than a single electrode channel to EHFs may be useful to provide the intended EHF benefit.

The observed EHF benefit is also in line with previous reports that EHF hearing loss is correlated with both self-reported and objectively measured speech-in-noise difficulty. The inclusion of routine EHF examinations may help to identify listeners at risk of difficulties listening in noise with otherwise normal clinical audiograms. There are multiple reasons why EHF loss might lead to a speech-in-noise difficulty. As shown here, EHFs contribute to speech-in-speech recognition when maskers are facing different directions, which is typical for real-world cocktail party environments. Similar to how visual cues of a social partner's head orientation and gaze can direct attention to that partner or other objects of interest, highly directional EHFs could serve to herald the potential importance of an interlocutor's speech signal, thereby drawing the listener's attention to that signal. That is, high-amplitude EHF energy will only be received from a talker that is directly facing a listener, which likely indicates that this listener is the intended recipient of the talker's utterance. In addition to this potential real-world cue, we have demonstrated here that spectral detail at EHFs provides information useful for speech-in-speech recognition. EHF hearing loss might lead to the degradation of these multiple sources of information.

The investigations described herein revealed that relationships between full-band SRTs and pure-tone thresholds across the frequency range of hearing only emerged at EHFs, in spite of the applied strict inclusion criterion for normal hearing (<25 dB HL in at least one ear) at all frequencies, including EHFs. This finding should inform future hypotheses regarding the relationship between EHF thresholds and speech-in-noise performance. The rotating of the maskers' heads in the present study introduces low-pass filtering effects, increasing the salience of EHF acoustic features for the target speech. This approach may elucidate the true relationship between EHF thresholds and speech-in-noise difficulty. It was previously found that 16-kHz thresholds for normal-hearing listeners correlated with ability to detect EHF energy in speech, and preliminary evidence is provided here for a relationship with the ability to use EHFs for speech-in-speech recognition.

Approximately 2 dB of improvement in SRT was observed when the maskers were rotated from 45° to 60° for full-band speech. That this consistent and significant improvement occurs with a change of only 15° in head orientation is striking and highlights the sensitivity of the auditory system to talker/masker head orientation, particularly as it pertains to speech recognition. It has been shown previously that the minimum audible change in a talker's head orientation, relative to a 0° head orientation, is approximately 41° for the average normal-hearing listener. It is clear that head orientation release from masking has a robust effect on speech-in-speech recognition for collocated maskers, although this effect may be reduced when maskers and target are spatially separated.

In summary, despite the well-known decrease in sensitivity and acuity at EHFs for the human auditory system, spectral detail at EHFs conveys information useful for speech-in-speech recognition. EHF spectral detail provides additional gains beyond that provided by EHF temporal (e.g., envelope) information. Speech-in-speech performance is highly sensitive to masker head orientation, with a change of only 15° having a robust effect. Evidence for a relationship between EHF pure-tone sensitivity and speech-in-noise scores was observed when listeners have no substantial hearing loss at EHFs. Implications include that the preservation of spectral detail at EHFs may be beneficial in ongoing efforts to extend the bandwidth of hearing aids and other devices or to restore audibility using frequency lowering or other amplification techniques. Furthermore, the continued use of speech materials that are bandlimited by recording sampling rate and/or transducer frequency response for speech-in-noise testing in the clinic and the laboratory precludes the beneficial effects of EHF hearing. Finally, real-world speech signals include effects of talker head orientation, and incorporating these effects might improve the precision and predictive power of speech recognition measures.

For example, a biomimetic device is provided that senses EHFs and utilizes EHFs to amplify the signal of interest (e.g., talker's speech) and to attenuate background noise in hearing aids and audio devices by using three filtering schemes.

Condition 1: A low pass filter using a 32-pole Butterworth filter with a cutoff frequency of 8 kHz.

Condition 2: A full-band condition where all stimuli were low-pass filtered at 20 kHz.

Condition 3: A condition that is designed to preserve temporal EHF information while removing EHF spectral detail.

The amplitude of EHF band may be extracted by a high pass filter at 8 kHz using a Parks-McClellan equiripple finite impulse response (FIR) filter, computing the Hilbert transform of the high-pass filtered signal, and low-pass filtering the magnitude of the Hilbert transform at 100 Hz.

Each 8-kHz low-pass filtered stimulus may then be summed with a spectrally flat EHF noise band (8-20 kHz) that was amplitude modulated using the envelope of the EHF band corresponding to that stimulus.

In another example, a method is provided to use EHFs to amplify the talker's speech and to attenuate background noise.

The biomimetic device may include a controller and/or processor and/or memory configured to sense EHFs and utilize EHFs to amplify the signal of interest.

Embodiments of the present disclosure may include a non-transitory computer readable medium having stored thereon instructions for carrying out the algorithm described above and/or one or more process steps described above.

III. EXAMPLE SYSTEMS

Figure 8:
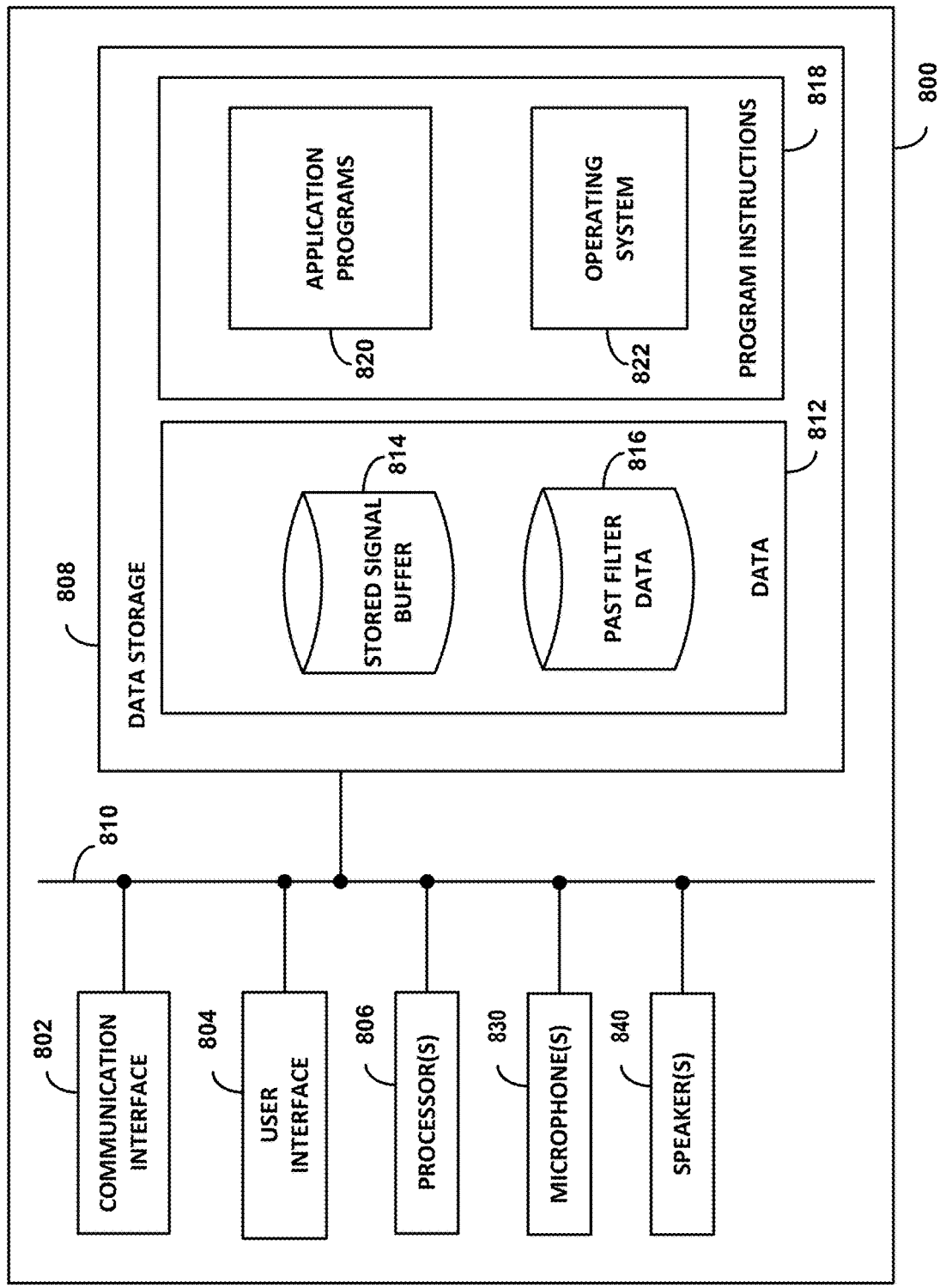
FIG. 8 illustrates aspects of an example system.

FIG. 8 illustrates an example system 800 that may be used to implement the methods described herein. By way of example and without limitation, system 800 may be or include a computer (such as a desktop, notebook, tablet, or handheld computer, a smartphone, a server), elements of a cloud computing system, elements of a hearing aid or other audio assistive device, or some other type of device or system. It should be understood that elements of system 800 may represent a physical instrument and/or computing device such as a server, smartphone, or hearing aid, a particular physical hardware platform on which applications operate in software, or other combinations of hardware and software that are configured to carry out functions as described herein.

As shown in FIG. 8, system 800 may include a communication interface 802, a user interface 804, one or more processor(s) 806, data storage 808, one or more microphones 830, and one or more speakers or other audio output elements 840, all of which may be communicatively linked together by a system bus, network, or other connection mechanism 810.

Communication interface 802 may function to allow system 800 to communicate, using analog or digital modulation of electric, magnetic, electromagnetic, optical, or other signals, with other devices, access networks, and/or transport networks. Thus, communication interface 802 may facilitate circuit-switched and/or packet-switched communication, such as plain old telephone service (POTS) communication and/or Internet protocol (IP) or other packetized communication. For instance, communication interface 802 may include a chipset and antenna arranged for wireless communication with a radio access network or an access point. Also, communication interface 802 may take the form of or include a wireline interface, such as an Ethernet, Universal Serial Bus (USB), or High-Definition Multimedia Interface (HDMI) port. Communication interface 802 may also take the form of or include a wireless interface, such as a Wi-Fi®, BLUETOOTH®, global positioning system (GPS), or wide-area wireless interface (e.g., 3GPP Long-Term Evolution (LTE), or 3GPP 5G). However, other forms of physical layer interfaces and other types of standard or proprietary communication protocols may be used over communication interface 802. Furthermore, communication interface 802 may comprise multiple physical communication interfaces (e.g., a Wi-Fi® interface, a BLUETOOTH® interface, and a wide-area wireless interface).

User interface 804 may function to allow system 800 to interact with a user, for example to receive input from and/or to provide output to the user. Thus, user interface 804 may include input components such as a button, keyboard, touch-sensitive or presence-sensitive panel or contact, microphone (e.g., one of the microphone(s) 830 also used as a user interface element), and so on. User interface 804 may also include one or more output components such as a display screen and/or indicator light(s) which, for example, may be combined with a presence-sensitive panel. The display screen may be based on LCD and/or LED technologies, or other technologies now known or later developed. User interface 804 may also be configured to generate audible output(s), via a speaker (e.g., via the speaker(s) 840), speaker jack, audio output port, audio output device, earphones, wired or wirelessly linked hearing aid(s) or other assistive devices, and/or other similar devices.

Microphone(s) 830 may include a variety of elements configured to allow audio signals to be measured from an environment, e.g., from an environment containing one or more people speaking to a user of the system 800. The microphone(s) 830 could include condenser microphones, optical microphones, MEMS microphones, or some other variety of elements configured to facilitate the detection of audio signals. In some examples, the system 800 could be or could include a hearing aid or other assistive device, in which case the microphone(s) 830 could be part of the hearing aid or other assistive device. Additionally or alternatively, the system 800 could be a system in communication with such an assistive device (e.g., a smartphone or other controller device in wired or wireless communication with a hearing aid or other assistive device), in which case the system 800 could lack the microphone(s) 830 and/or the system 800 could perform one or more of the methods described herein based on audio signals obtained via wireless communication with such an assistive device.

Speaker(s) 840 may include a variety of elements configured to allow output audio signals to be transmitted as sound from the system 800. The speaker(s) 840 could include moving-coil speakers, piezoelectric speakers, or some other variety of elements configured to facilitate the generation of sound. In some examples, the system 800 could be or could include a hearing aid or other assistive device, in which case the speaker(s) 840 could be part of the hearing aid or other assistive device. Additionally or alternatively, the system 800 could be a system in communication with such an assistive device (e.g., a smartphone or other controller device in wired or wireless communication with a hearing aid or other assistive device), in which case the system 800 could lack the speaker(s) 840 and/or the system 800 could perform one or more of the methods described herein and provide the generated output audio to such an assistive device via wireless communication therewith, thereby allowing the assistive device to provide the output audio signal as sound to a user.

Processor(s) 806 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). Data storage 808 may include one or more volatile and/or non-volatile storage components, such as magnetic, optical, flash, or organic storage, and may be integrated in whole or in part with processor(s) 806. Data storage 808 may include removable and/or non-removable components.

Processor(s) 806 may be capable of executing program instructions 818 (e.g., compiled or non-compiled program logic and/or machine code) stored in data storage 808 to carry out the various functions described herein. Therefore, data storage 808 may include a non-transitory computer-readable medium, having stored thereon program instructions that, upon execution by system 800, cause system 800 to carry out any of the methods, processes, or functions disclosed in this specification and/or the accompanying drawings. The execution of program instructions 818 by processor(s) 806 may result in processor 806 using data 812.

By way of example, program instructions 818 may include an operating system 822 (e.g., an operating system kernel, device driver(s), and/or other modules) and one or more application programs 820 (e.g., functions for executing the methods described herein) installed on system 800. Data 812 may include stored audio signal buffer data 814 (e.g., stored audio signals from one or more previous incidents during which an input audio signal exhibited elevated frequency content above a threshold frequency) that could be used, e.g., to generate updated audio filters for use in filtering input audio to generate output audio (e.g., as part of a hearing assistive function of the system 800). Data 812 may include past filter data 816 (e.g., stored parameters, matrices of factorized basis vectors, or other information representative of previously-generated audio filters) that could be used, in combination with newly-generated audio filters (e.g., by weighted combination of parameters thereof), to determine new audio filters for use in filtering input audio to generate output audio.

Application programs 820 may communicate with operating system 822 through one or more application programming interfaces (APIs). These APIs may facilitate, for instance, application programs 820 transmitting or receiving information via communication interface 802, receiving and/or displaying information on user interface 804, and so on.

Application programs 820 may take the form of "apps" that could be downloadable to system 800 through one or more online application stores or application markets (via, e.g., the communication interface 802). However, application programs can also be installed on system 800 in other ways, such as via a web browser or through a physical interface (e.g., a USB port) of the system 800.

IV. EXAMPLE METHODS

Figure 9:
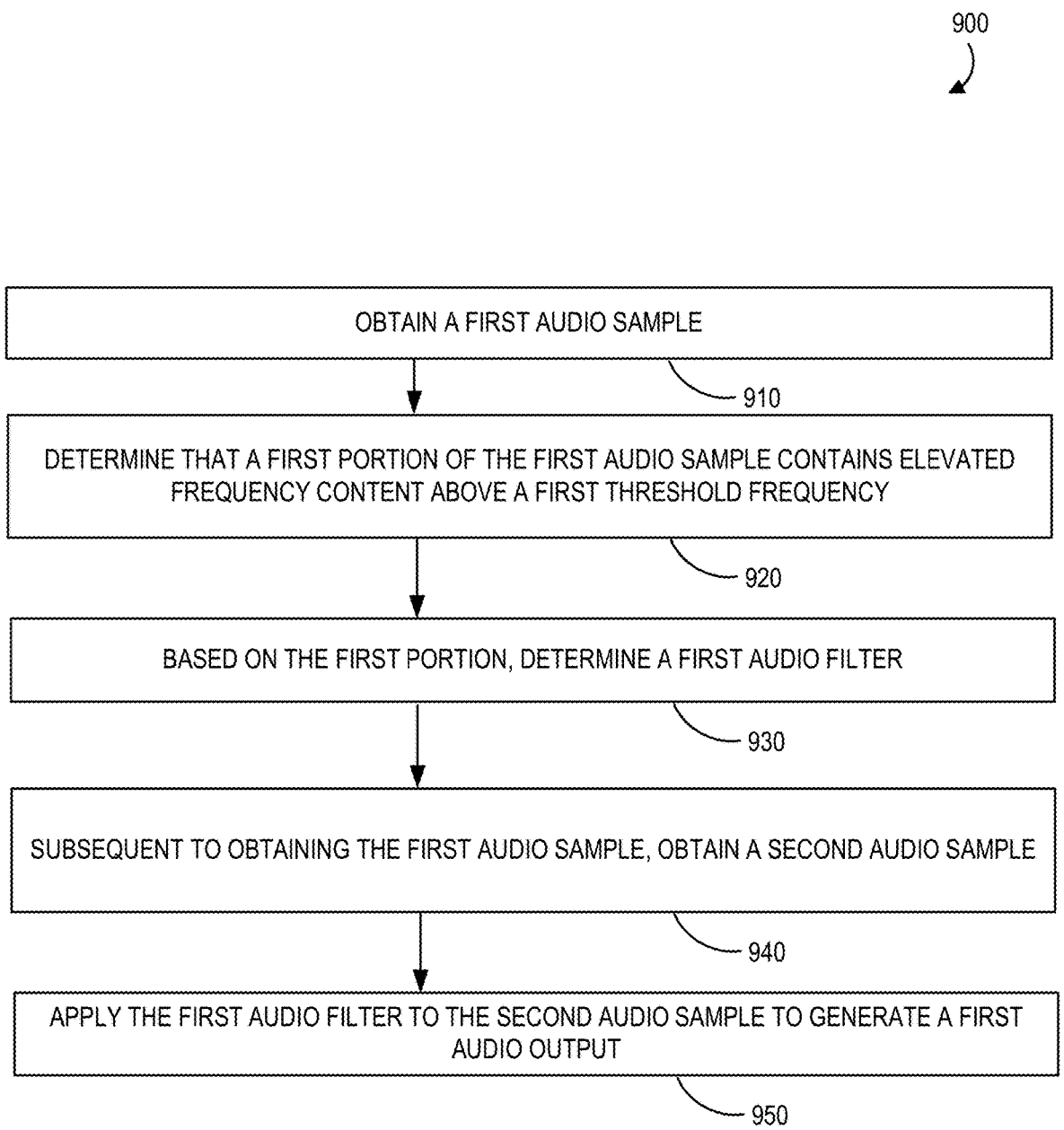
FIG. 9 illustrates a flowchart of an example method.

FIG. 9 depicts an example method 900. The method 900 includes obtaining a first audio sample (910). The method 900 additionally includes determining that a first portion of the first audio sample contains elevated frequency content above a first threshold frequency (920). The method 900 additionally includes, based on the first portion, determining a first audio filter (930). The method 900 additionally includes, subsequent to obtaining the first audio sample, obtaining a second audio sample (940). The method 900 additionally includes applying the first audio filter to the second audio sample to generate a first audio output (950). The method 900 could include additional steps or features.

The method 900 could additionally include: (i) determining a plurality of zero-crossing rates across time for the first audio sample; and (ii) determining a plurality of signal energy levels across time for the first audio sample, wherein determining that the first portion contains the elevated frequency content comprises determining (a) that a zero-crossing rate, of the plurality of zero-crossing rates, that corresponds to the first portion exceeds a threshold zero-crossing rate and (b) that a signal energy level, of the plurality of signal energy levels, that corresponds to the first portion exceeds a threshold signal energy level.

When performing the method 900, determining that the first portion contains the elevated frequency content could include: (i) determining a spectrogram for the first portion; and (ii) determining that a total energy in the spectrogram above the first threshold frequency exceeds a threshold energy level.

When performing the method 900, the first audio sample could be divided into a plurality of non-overlapping frames, and determining that the first portion contains the elevated frequency content could include determining that a contiguous subset of the plurality of non-overlapping frames of the first audio sample all contain the elevated frequency content, wherein the first portion consists of the contiguous subset of frames of the first audio sample. For example, each frame of the plurality of non-overlapping frames of the first audio sample has a duration between 15 milliseconds and 50 milliseconds.

When performing the method 900, the first threshold frequency could be at least 5.6 kilohertz, at least 6 kHz, at least 7 kHz, or at least 8 kHz. When performing the method 900, the sampling rate used to obtain the audio should be high, so as to retain a significant amount of EHF frequency contents of the input audio signal. For example, the sampling rate could be sufficiently high (e.g., greater than 32 kHz, or greater than 40 kHz) that the obtained audio signal includes high frequency content at frequencies above at least 16 kHz, or above at least 20 kHz.

When performing the method 900, determining the first audio filter based on the first portion could include determining the first audio filter based on frequency contents of the first audio signal below a second threshold frequency.

When performing the method 900, determining the first audio filter based on the first portion could include: (i) determining a first spectrogram for the first portion; and (ii) performing non-negative matrix factorization to generate a first matrix and a second matrix whose product corresponds to a portion of the first spectrogram below a second threshold frequency, wherein the first matrix is composed of a set of column vectors that span along a frequency dimension of the first spectrogram, and wherein the second matrix is composed of a set of row vectors that span along a time dimension of the first spectrogram; and applying the first audio filter to the second audio sample to generate the first audio output could include: (i) determining a second spectrogram for the second audio sample; (ii) applying the first matrix to a portion of the second spectrogram below the second threshold frequency to generate a third spectrogram that represents noise content of the second audio sample; and (iii) using the third spectrogram to remove the noise content from the second audio sample, thereby generating the first audio output. For example, using the third spectrogram to remove the noise content from the second audio sample could include: (i) performing an inverse transform on the third spectrogram to generated a time-domain noise signal; and (ii) subtracting the time-domain noise signal from the second audio sample to generate the first audio output. Additionally or alternatively, the method 900 could additionally include: (i) prior to obtaining the first audio sample, obtaining a third audio sample; (ii) determining that a second portion of the third audio sample contains elevated frequency content above the first threshold frequency; and (iii) based on the second portion of the third audio sample, determining a second audio filter by: (a) determining a fourth spectrogram for the second portion; and (b) performing non-negative matrix factorization to generate a third matrix and a fourth matrix whose product corresponds to a portion of the fourth spectrogram below the second threshold frequency, wherein the third matrix is composed of a further set of column vectors that span along a frequency dimension of the fourth spectrogram, and wherein the fourth matrix is composed of a further set of row vectors that span along a time dimension of the fourth spectrogram, and performing non-negative matrix factorization to generate the first matrix and the second matrix could include using, as an initial estimate of the first matrix, the third matrix.

The method 900 could additionally include: (i) prior to obtaining the first audio sample, obtaining a third audio sample; (ii) determining that a second portion of the third audio sample contains the elevated frequency content; and (iii) based on the first portion, determining a second audio filter, wherein determining the first audio filter based on the first portion could include: (a) determining a third audio filter based on the first portion; and (b) determining the first audio filter as a weighted combination of the first audio filter and the third audio filter.

When performing the method 900, determining the first audio filter based on the first portion could include: (i) adding the first portion to a buffer that includes prior-obtained portions of audio samples determined to contain the elevated frequency content; and (ii) determining the first audio filter based on the buffer.

Figure 10:
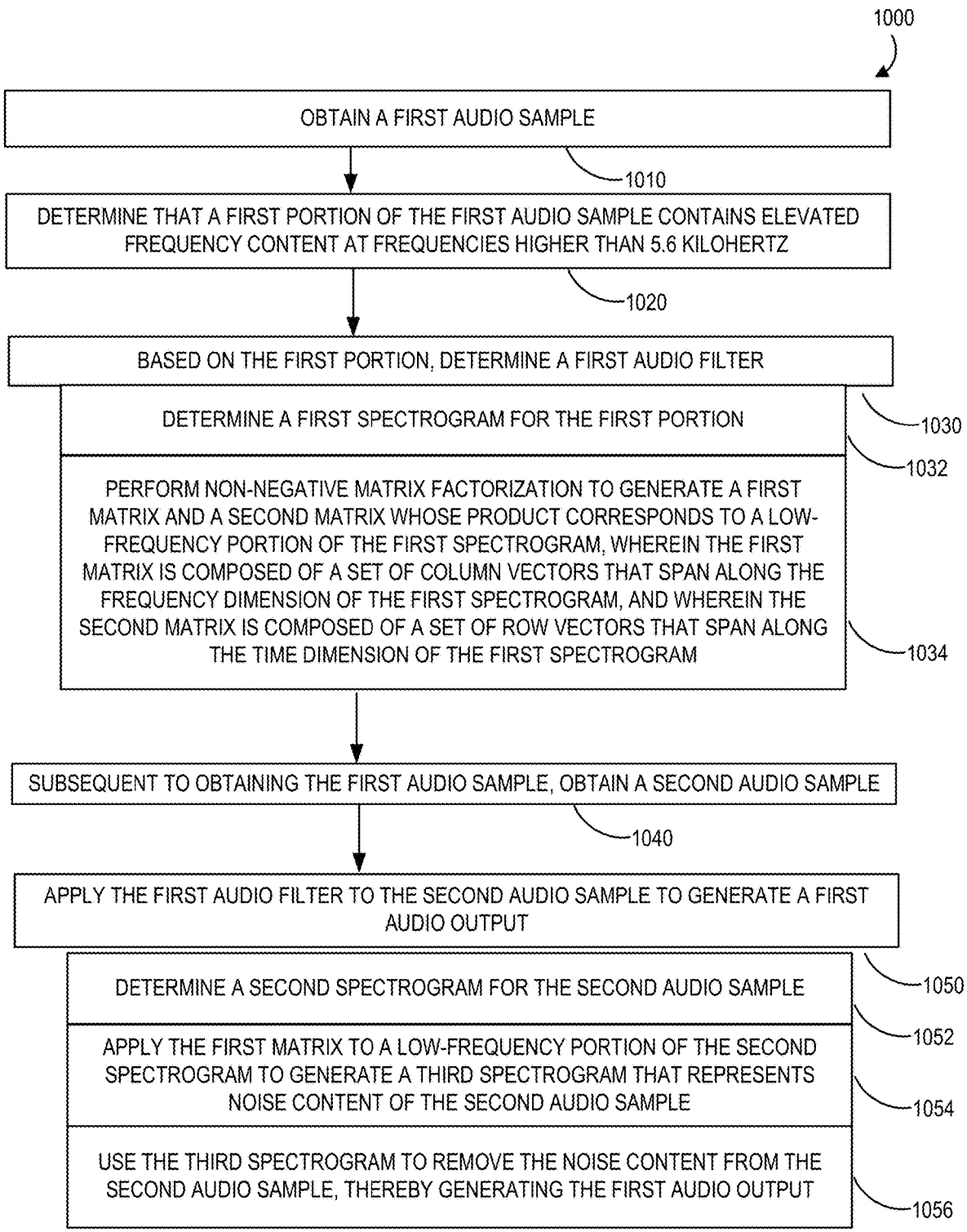
FIG. 10 illustrates a flowchart of an example method.

FIG. 10 depicts an example method 1000. The method 1000 includes obtaining a first audio sample (1010). The method 1000 additionally includes determining that a first portion of the first audio sample contains elevated frequency content at frequencies higher than 5.6 kilohertz (1020). The method 1000 additionally includes, based on the first portion, determining a first audio filter (1030). Determining the first audio filter (1030) includes determining a first spectrogram for the first portion (1032) and performing non-negative matrix factorization to generate a first matrix and a second matrix whose product corresponds to a low-frequency portion of the first spectrogram, wherein the first matrix is composed of a set of column vectors that span along the frequency dimension of the first spectrogram, and wherein the second matrix is composed of a set of row vectors that span along the time dimension of the first spectrogram (1034). The method 1000 additionally includes, subsequent to obtaining the first audio sample, obtaining a second audio sample (1040). The method 1000 additionally includes applying the first audio filter to the second audio sample to generate a first audio output (1050). Applying the first audio filter to the second audio sample to generate a first audio output (1050) includes determining a second spectrogram for the second audio sample (1052), applying the first matrix to a low-frequency portion of the second spectrogram to generate a third spectrogram that represents noise content of the second audio sample (1054), and using the third spectrogram to remove the noise content from the second audio sample, thereby generating the first audio output (1056). The method 1000 could include additional steps or features.

The method 1000 could additionally include: (i) determining a plurality of zero-crossing rates across time for the first audio sample; and (ii) determining a plurality of signal energy levels across time for the first audio sample, wherein determining that the first portion contains the elevated frequency content comprises determining (a) that a zero-crossing rate, of the plurality of zero-crossing rates, that corresponds to the first portion exceeds a threshold zero-crossing rate and (b) that a signal energy level, of the plurality of signal energy levels, that corresponds to the first portion exceeds a threshold signal energy level.

When performing the method 1000, the first audio sample could be divided into a plurality of non-overlapping frames, and determining that the first portion contains the elevated frequency content could include: determining that a contiguous subset of the plurality of non-overlapping frames of the first audio sample all contain the elevated frequency content, wherein the first portion consists of the contiguous subset of frames of the first audio sample.

The method 1000 could additionally include: (i) prior to obtaining the first audio sample, obtaining a third audio sample; (ii) determining that a second portion of the third audio sample contains elevated frequency content at frequencies higher than 5.6 kilohertz; and (iii) based on the second portion of the third audio sample, determining a second audio filter by: (a) determining a fourth spectrogram for the second portion; and (b) performing non-negative matrix factorization to generate a third matrix and a fourth matrix whose product corresponds to a portion of the fourth spectrogram below a threshold frequency, wherein the third matrix is composed of a further set of column vectors that span along a frequency dimension of the fourth spectrogram, and wherein the fourth matrix is composed of a further set of row vectors that span along a time dimension of the fourth spectrogram, wherein performing non-negative matrix factorization to generate the first matrix and the second matrix could include using, as an initial estimate of the first matrix, the third matrix.

Figure 11:
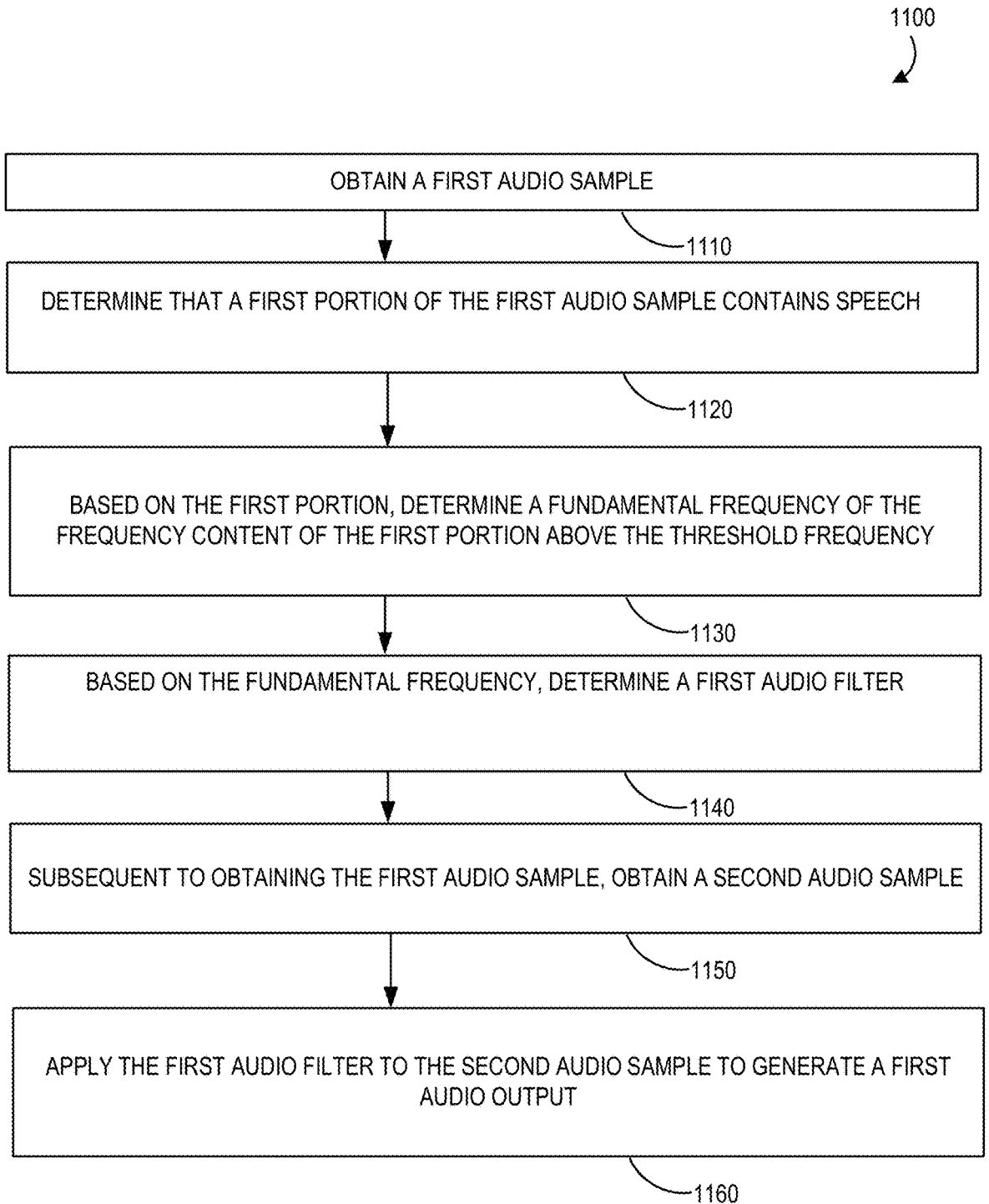
FIG. 11 illustrates a flowchart of an example method.

FIG. 11 depicts an example method 1100. The method 1100 includes obtaining a first audio sample (1110). The method 1100 additionally includes determining that a first portion of the first audio sample contains speech (1120). This could include determining that the first portion of the first audio sample contains voiced speech. The method 1100 additionally includes, based on the first portion, determining a fundamental frequency of the frequency content of the first portion above the threshold frequency (1130). The method 1100 additionally includes, based on the fundamental frequency, determining a first audio filter (1140). This could include determining the first audio filter such that the first audio filter emphasizes and/or preferentially passes signal content at the fundamental frequency and at harmonics thereof. The method 1100 additionally includes, subsequent to obtaining the first audio sample, obtaining a second audio sample (1150). The method 1100 additionally includes applying the first audio filter to the second audio sample to generate a first audio output (1160). The method 1100 could include additional steps or features.

The method 1100 could additionally include: (i) determining a plurality of zero-crossing rates across time for the first audio sample; and (ii) determining a plurality of signal energy levels across time for the first audio sample, wherein determining that the first portion contains the elevated frequency content comprises determining (a) that a zero-crossing rate, of the plurality of zero-crossing rates, that corresponds to the first portion exceeds a threshold zero-crossing rate and (b) that a signal energy level, of the plurality of signal energy levels, that corresponds to the first portion exceeds a threshold signal energy level.

When performing the method 1100, the first audio sample could be divided into a plurality of non-overlapping frames, and determining that the first portion contains the elevated frequency content could include: determining that a contiguous subset of the plurality of non-overlapping frames of the first audio sample all contain the elevated frequency content, wherein the first portion consists of the contiguous subset of frames of the first audio sample.

When performing the method 1100, the threshold frequency could be at least 5.6 kilohertz, at least 6 kHz, at least 7 kHz, or at least 8 kHz.

It should be understood that arrangements described herein are for purposes of example only. As such, those skilled in the art will appreciate that other arrangements and other elements (e.g., machines, interfaces, operations, orders, and groupings of operations, etc.) can be used instead of or in addition to the illustrated elements or arrangements.

V. CONCLUSION

It should be understood that arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A non-transitory computer readable medium comprising program instructions executable by at least one processor to cause the at least one processor to perform a method comprising:
   obtaining a first audio sample;
   determining that a first portion of the first audio sample contains frequency content at frequencies higher than 5.6 kilohertz that exceeds a threshold energy level;
   responsive to determining that the first portion contains frequency content at frequencies higher than 5.6 kilohertz that exceeds the threshold energy level, determining a first audio filter based on the first portion of the first audio sample by:
      determining a first spectrogram for the first portion; and
      performing non-negative matrix factorization to generate a first matrix and a second matrix whose product corresponds to a low-frequency portion of the first spectrogram that is below a threshold frequency, wherein the first matrix is composed of a set of column vectors that span along a frequency dimension of the first spectrogram, and wherein the second matrix is composed of a set of row vectors that span along a time dimension of the first spectrogram;
   subsequent to obtaining the first audio sample, obtaining a second audio sample; and
   applying the first audio filter to the second audio sample to generate a first audio output by:
      determining a second spectrogram for the second audio sample;
      applying the first matrix to a low-frequency portion of the second spectrogram that is below the threshold frequency to generate a third spectrogram that represents noise content of the second audio sample; and
      using the third spectrogram to remove the noise content from the second audio sample, thereby generating the first audio output.

2. The non-transitory computer readable medium of claim 1, wherein the method further comprises:
   determining a plurality of zero-crossing rates across time for the first audio sample; and
   determining a plurality of signal energy levels across time for the first audio sample, wherein determining that the first portion contains frequency content at frequencies higher than 5.6 kilohertz that exceeds the threshold energy level comprises determining (i) that a zero-crossing rate, of the plurality of zero-crossing rates, that corresponds to the first portion exceeds a threshold zero-crossing rate and (ii) that a signal energy level, of the plurality of signal energy levels, that corresponds to the first portion exceeds a threshold signal energy level.

3. The non-transitory computer readable medium of claim 1, wherein the first audio sample is divided into a plurality of non-overlapping frames, and wherein determining that the first portion contains frequency content at frequencies higher than 5.6 kilohertz that exceeds the threshold energy level comprises:
  determining that a contiguous subset of the plurality of non-overlapping frames of the first audio sample all contain frequency content at frequencies higher than 5.6 kilohertz that exceeds the threshold energy level, wherein the first portion consists of the contiguous subset of frames of the first audio sample.

4. The non-transitory computer readable medium of claim 3, wherein each frame of the plurality of non-overlapping frames of the first audio sample has a duration between 15 milliseconds and 50 milliseconds.

5. The non-transitory computer readable medium of claim 1, wherein the method further comprises:
  prior to obtaining the first audio sample, obtaining a third audio sample;
  determining that a second portion of the third audio sample contains frequency content at frequencies higher than 5.6 kilohertz that exceeds the threshold energy level; and
  responsive to determining that the second portion of the third audio sample contains frequency content at frequencies higher than 5.6 kilohertz that exceeds the threshold energy level, determining a second audio filter based on the second portion of the third audio sample by:
    determining a fourth spectrogram for the second portion; and
    performing non-negative matrix factorization to generate a third matrix and a fourth matrix whose product corresponds to a portion of the fourth spectrogram below the threshold frequency, wherein the third matrix is composed of a further set of column vectors that span along a frequency dimension of the fourth spectrogram, and wherein the fourth matrix is composed of a further set of row vectors that span along a time dimension of the fourth spectrogram,
  wherein performing non-negative matrix factorization to generate the first matrix and the second matrix comprises using, as an initial estimate of the first matrix, the third matrix.

6. The non-transitory computer readable medium of claim 1, wherein determining that the first portion contains frequency content at frequencies higher than 5.6 kilohertz that exceeds the threshold energy level comprises:
  determining a spectrogram for the first portion; and
  determining that a total energy in the spectrogram above 5.6 kilohertz exceeds the threshold energy level.

7. The non-transitory computer readable medium of claim 1, wherein using the third spectrogram to remove the noise content from the second audio sample comprises:
  performing an inverse transform on the third spectrogram to generated a time-domain noise signal; and
  subtracting the time-domain noise signal from the second audio sample to generate the first audio output.

8. The non-transitory computer readable medium of claim 1, wherein the method further comprises:
  prior to obtaining the first audio sample, obtaining a third audio sample;
  determining that a second portion of the third audio sample contains frequency content at frequencies higher than 5.6 kilohertz that exceeds the threshold energy level; and
  responsive to determining that the second portion of the third audio sample contains frequency content at frequencies higher than 5.6 kilohertz that exceeds the threshold energy level, determining a second audio filter based on the second portion of the third audio sample,
wherein determining the first audio filter based on the first portion comprises:
  determining a third audio filter based on the first portion; and
  determining the first audio filter as a weighted combination of the second audio filter and the third audio filter.

9. A method comprising:
obtaining a first audio sample;
determining that a first portion of the first audio sample contains frequency content at frequencies higher than 5.6 kilohertz that exceeds a threshold energy level;
responsive to determining that the first portion contains frequency content at frequencies higher than 5.6 kilohertz that exceeds the threshold energy level, determining a first audio filter based on the first portion of the first audio sample by:
  determining a first spectrogram for the first portion; and
  performing non-negative matrix factorization to generate a first matrix and a second matrix whose product corresponds to a low-frequency portion of the first spectrogram that is below a threshold frequency, wherein the first matrix is composed of a set of column vectors that span along a frequency dimension of the first spectrogram, and wherein the second matrix is composed of a set of row vectors that span along a time dimension of the first spectrogram;
subsequent to obtaining the first audio sample, obtaining a second audio sample; and
applying the first audio filter to the second audio sample to generate a first audio output by:
  determining a second spectrogram for the second audio sample;
  applying the first matrix to a low-frequency portion of the second spectrogram that is below the threshold frequency to generate a third spectrogram that represents noise content of the second audio sample; and
  using the third spectrogram to remove the noise content from the second audio sample, thereby generating the first audio output.

10. The method of claim 9, further comprising:
determining a plurality of zero-crossing rates across time for the first audio sample; and
determining a plurality of signal energy levels across time for the first audio sample, wherein determining that the first portion contains frequency content at frequencies higher than 5.6 kilohertz that exceeds the threshold energy level comprises determining (i) that a zero-crossing rate, of the plurality of zero-crossing rates, that corresponds to the first portion exceeds a threshold zero-crossing rate and (ii) that a signal energy level, of the plurality of signal energy levels, that corresponds to the first portion exceeds a threshold signal energy level.

11. The method of claim 9, wherein the first audio sample is divided into a plurality of non-overlapping frames, and wherein determining that the first portion contains frequency content at frequencies higher than 5.6 kilohertz that exceeds the threshold energy level comprises:
  determining that a contiguous subset of the plurality of non-overlapping frames of the first audio sample all contain frequency content at frequencies higher than 5.6 kilohertz that exceeds the threshold energy level, wherein the first portion consists of the contiguous subset of frames of the first audio sample.

12. The method of claim 11, wherein each frame of the plurality of non-overlapping frames of the first audio sample has a duration between 15 milliseconds and 50 milliseconds.

13. The method of claim 9, further comprising:
prior to obtaining the first audio sample, obtaining a third audio sample;
determining that a second portion of the third audio sample contains frequency content at frequencies higher than 5.6 kilohertz that exceeds the threshold energy level; and
responsive to determining that the second portion of the third audio sample contains frequency content at frequencies higher than 5.6 kilohertz that exceeds the threshold energy level, determining a second audio filter based on the second portion of the third audio sample by:
determining a fourth spectrogram for the second portion; and
performing non-negative matrix factorization to generate a third matrix and a fourth matrix whose product corresponds to a portion of the fourth spectrogram below the threshold frequency, wherein the third matrix is composed of a further set of column vectors that span along a frequency dimension of the fourth spectrogram, and wherein the fourth matrix is composed of a further set of row vectors that span along a time dimension of the fourth spectrogram,
wherein performing non-negative matrix factorization to generate the first matrix and the second matrix comprises using, as an initial estimate of the first matrix, the third matrix.

14. The method of claim 9, wherein determining that the first portion contains frequency content at frequencies higher than 5.6 kilohertz that exceeds the threshold energy level comprises:
determining a spectrogram for the first portion; and
determining that a total energy in the spectrogram above 5.6 kilohertz exceeds the threshold energy level.

15. The method of claim 9, wherein using the third spectrogram to remove the noise content from the second audio sample comprises:
performing an inverse transform on the third spectrogram to generated a time-domain noise signal; and
subtracting the time-domain noise signal from the second audio sample to generate the first audio output.

16. The method of claim 9, further comprising:
prior to obtaining the first audio sample, obtaining a third audio sample;
determining that a second portion of the third audio sample contains frequency content at frequencies higher than 5.6 kilohertz that exceeds the threshold energy level; and
responsive to determining that the second portion of the third audio sample contains frequency content at frequencies higher than 5.6 kilohertz that exceeds the threshold energy level, determining a second audio filter based on the second portion of the third audio sample,
wherein determining the first audio filter based on the first portion comprises:
determining a third audio filter based on the first portion; and
determining the first audio filter as a weighted combination of the second audio filter and the third audio filter.

* * * * *